US005933221A

United States Patent [19]

Shima et al.

[11] Patent Number: 5,933,221

[45] Date of Patent: Aug. 3, 1999

[54] PHOTOGRAPHIC PRINTING APPARATUS

[75] Inventors: Kazunobu Shima; Yuji Yamamoto; Hidetoshi Nishikawa, all of Wakayama, Japan

[73] Assignee: Noritsu Koki Co., Ltd., Wakayama, Japan

[21] Appl. No.: 08/542,458

[22] Filed: Oct. 12, 1995

[30] Foreign Application Priority Data

| | | | |
|---|---|---|---|
| Oct. 13, 1994 | [JP] | Japan | 6-247966 |
| Feb. 22, 1995 | [JP] | Japan | 7-033890 |
| Oct. 5, 1995 | [JP] | Japan | 7-258765 |

[51] Int. Cl.[6] .......... G03B 27/58

[52] U.S. Cl. .......... 355/72; 355/27

[58] Field of Search .......... 355/18, 27, 28, 355/29, 72

[56] References Cited

U.S. PATENT DOCUMENTS

| | | | |
|---|---|---|---|
| 4,155,546 | 5/1979 | Jacobs . | |
| 4,601,570 | 7/1986 | Bartz et al. | 355/27 |
| 4,791,456 | 12/1988 | Hope et al. | 355/28 |
| 4,835,574 | 5/1989 | Ohi . | |
| 4,837,601 | 6/1989 | Nakane et al. | 355/28 |
| 4,866,472 | 9/1989 | Yamakoshi et al. . | |
| 4,870,450 | 9/1989 | Higashi | 355/27 |
| 4,881,095 | 11/1989 | Shidara | 354/298 |
| 4,926,211 | 5/1990 | Ozawa | 355/28 |
| 4,931,826 | 6/1990 | Lucht et al. | 355/28 |
| 4,999,667 | 3/1991 | Fukushima | 355/28 |
| 5,168,301 | 12/1992 | Akisada et al. | 355/27 |
| 5,320,341 | 6/1994 | Pease et al. . | |

FOREIGN PATENT DOCUMENTS

| | | |
|---|---|---|
| 0 565 254 | 10/1993 | European Pat. Off. . |
| 38 31 475 | 7/1989 | Germany . |
| 42 35 961 | 4/1994 | Germany . |

*Primary Examiner*—Safet Metjahic
*Assistant Examiner*—John Chizmar
*Attorney, Agent, or Firm*—Wenderoth, Lind & Ponack, LLP

[57] ABSTRACT

A photographic printing apparatus includes a pause transfer device disposed on a transfer passage between a printing station and a development station for holding temporarily an excess of printed sheets of a photosensitive material over that which can be handled by the development station and for transferring printed sheets of the photosensitive material to the development station one after another depending on the developing process.

19 Claims, 21 Drawing Sheets

PHOTOGRAPHIC PRINTING APPARATUS

FIELD OF THE INVENTION

The present invention relates to a photographic printing apparatus, and more particularly to, an apparatus which allows sheets of photosensitive material on which images are printed to be held temporarily before being transferred automatically to a development station.

BACKGROUND OF THE INVENTION

Photographic printing apparatuses are commonly adapted for processing a photosensitive material intermittently at the printing station and continuously at the development station. During the intermittent processing at the printing station, replacement of a negative film with a new one may be carried out. Even if the printing operation at the printing station has been finished, a succeeding one of the photosensitive material sheets cannot be subjected to the printing before the development operation at the development station is completed. Also, during the replacement of the negative film with a new one at the printing station, the development operation is inhibited, thus disturbing a smooth cycle of the printing and development operations.

For compensation of the above situation, a modified apparatus is provided in which an accumulator unit acting as a device for eliminating a difference of operational capability between the two stations to allow more efficient development operations is disposed between the printing station and the development station (as disclosed in Japanese Patent Application Publication 2-281255 (1990)). The modified apparatus is designed for processing substantially poster-sized sheets of photosensitive material by holding each of them bent in a loop. If the sheet of photosensitive material is too small or rigid to be looped, it can hardly be handled with such apparatus. The apparatus also allows only a single sheet of the photosensitive material to be held. When two or more of the photosensitive material sheets are to be held, a corresponding number of accumulator units have to be provided. This will cause the apparatus to increase its overall size.

It is an object of the present invention, in view of the foregoing predicament, to provide a photographic printing apparatus capable of holding temporarily a desired number of sheets of a photosensitive material in one location without bending them in loops.

SUMMARY OF THE INVENTION

A photographic printing apparatus according to the present invention includes a pause transfer device disposed on a transfer passage between a printing station and a development station for stockpiling or storing temporarily in a continuously held condition an excess of printed sheets of a photosensitive material over that which can be handled by the development station and for transferring printed sheets of the photosensitive material to the development station one after another depending on conditions of the developing process.

The pause transfer device may comprise: a pausing means including a plurality of gripper members for continuously holding the leading ends of respective printed sheets of the photosensitive material, and a carrier member having the gripper members mounted at equal intervals thereon and arranged movably along an annular transfer path; a feeding means for guiding the leading ends of the printed sheets of the photosensitive material to a feeding location of the pausing means where they are held one after another by the gripper members; and a conveying means for releasing the leading ends of the printed sheets of the photosensitive material from their respective gripper members which have been carried from the feeding location to a transfer point and delivering them to the development station.

The pause transfer device may comprise: a pausing means for continuously holding a number of the printed sheets of the photosensitive material at a holding distance of the transfer path; and a holding number adjusting means for controlling the holding distance of the transfer path by moving turns provided across the holding distance of the transfer path to and from a minimum length of the holding distance. The holding distance of the transfer path for holding temporarily a number of the printed sheets of the photosensitive material ma be defined between a pair of transfer belts, and the turns across the holding distance may be provided by folding the two belts. The holding distance of the transfer path may be defined by a combination of a transfer belt and at least any of pressing belts, guides, and press rollers aligned along the transfer belt. The turns may thus be provided by folding the transfer belt and moving at least any of the pressing belts, guides, and press rollers in response to the folding of the transfer belt.

The pause transfer device may comprise: a pausing means having a pair of transfer belts arranged in parallel for continuously holding and conveying a number of the printed sheets of the photosensitive material therebetween; a feeding means for feeding the printed sheets of the photosensitive material one partly over the other to the pausing means so that they overlap one another; and a conveying means for dragging and transferring the leading ends of the printed sheets of the photosensitive material to the development station.

The pause transfer device may comprise: a pausing means including an endless belt composed mainly of a plurality of holding plates joined to one another by hinges so that they can be folded one over the other, a storage for temporarily storing a part of the endless belt in a folded form, a belt loader for loading the endless belt into the storage, and a belt unloader for unloading the endless belt from the storage; a feeding means for feeding and sandwiching each printed sheet of the photosensitive material between respective two adjacent holding plates of the endless belt at the start end of the folded form in the storage in synchronization with the loading of the belt loader, so that the printed sheets i continuously held between the two holding plates; and a conveying means for drawing out each printed sheet of the photosensitive material from two adjacent holding plates of the endless belt at the terminal end of the folded form in the storage in synchronization with the unloading of the belt unloader and transferring it to the development station.

The pause transfer device may comprise: a pausing means for continuously holding a number of printed sheets of the photosensitive material in a stack; a feeding means for feeding the printed sheets of the photosensitive material into the pausing means; a separating means for separating the leading end of a lowermost or uppermost sheet from the stack of the printed sheets of the photosensitive material held in the pausing means by capturing the lower or upper side of both the leading and trailing ends of the lowermost or uppermost sheet by suction of suction heads which have suction openings therein and are disposed opposite to the leading and trailing ends of the sheet, and moving the suction head at the leading end downwardly or upwardly; and a conveying means for nipping the leading end of the printed sheet of the photosensitive material separated by the separating means from the stack in the pausing means and transferring it to the development station.

The pause transfer device may comprise: a pausing means for continuously holding a number of printed sheets of the photosensitive material in a stack; a feeding means for feeding the printed sheets of the photosensitive material into the pausing means; a separating means having a suction head provided with a suction opening for grasping the sheets of the photosensitive material and a separation assisting region formed by recessing the surface of the suction head around the suction opening so that the leading end of lowermost or uppermost sheet is separated from the stack of the printed sheets of the photosensitive material held in the pausing means by capturing the lower or upper side of the lowermost or uppermost sheet by suction action of the suction opening and moving the suction opening downwardly or upwardly; and a conveying means for nipping the leading end of the printed sheet of the photosensitive material separated by the separating means from the stack in the pausing means and transferring it to the development station.

The number of the printed sheets of the photosensitive material to be temporarily held in the pausing means may be determined depending on the relation between a time interval required for replacement of a negative film in the printing station and the efficiency of developing process in the development station. Also, the number of the printed sheets of the photosensitive material to be temporarily held in the pausing means may be at least four. Furthermore, the number of the printed sheets of the photosensitive material to be temporarily held in the pausing means may adjustably be determined corresponding to an excess of the printed sheets of the photosensitive material over that which can be handled by the development station.

A number of the printed sheets of the photosensitive material processed in the printing station at a high speed regardless of the speed of developing process in the development station are temporarily held in the pause transfer device and will be delivered to the development station according to the speed of the developing process. This allows compensation of a difference of time between the printing process and the developing process.

The printed sheets of the photosensitive material can be held by the gripper members at the feeding point of the transfer path in the pausing means and carried along the transfer path to the transfer point in the pausing means. The printed sheets of the photosensitive material are then released from the gripper members at the transfer point of the pausing means and conveyed further to the development station. Accordingly, the photographic printing apparatus allows a number of the printed sheets of the photosensitive material to be temporarily held during their traveling on the gripper members from the feeding location to the transfer point of the annular transfer path in the pausing means, thus compensating for a time difference between the printing process and the developing process.

A number of the printed sheets of the photosensitive material can be held temporarily while being carried along the transfer belt. Also, the number of the printed sheets of the photosensitive material to be held temporarily can be decreased by moving the turns to minimize length of the holding distance of the transfer path and thus shortening the transfer path of the transfer belt. Conversely, when the turns are moved to lengthen the holding distance from the minimum length, the holding distance of the transfer path increases and allows a larger number of the printed sheets of the photosensitive material to be held. As a result, the printed sheets of the photosensitive material can be transferred without delay to the development station according to the condition of developing process.

A number of the printed sheets of the photosensitive material can be held temporarily while being carried between the two transfer belts. A desired number of the printed sheets of the photosensitive material are delivered to the development station corresponding to the condition of developing process by folding the transfer belts to displace turns thereof and thus to vary the length of the transfer path.

A number of the printed sheets of the photosensitive material can be held temporarily while being carried between the transfer belt and any of pressing belts, guides, and press rollers aligned along the transfer belt. A desired number of the printed sheets of the photosensitive material are delivered to the development station corresponding to the condition of developing process by folding the transfer belt and displacing any of the pressing belts, guides, and press rollers in response to folding of the transfer belt, thus to vary the length of the transfer path.

A number of the printed sheets of the photosensitive material can be held temporarily while being carried between the two transfer belts arranged in parallel, thus compensating for a time difference between the printing process and the developing process. Also, the printed sheets of the photosensitive material are overlapped one after another so as to increase the number thereof to be held temporarily printing the printing station continues. During the overlapping operation, the leading end of each sheet is placed over the trailing end of a preceding sheet. Hence, the leading end of the preceding sheet can easily be picked up and separated from a row of remaining sheets.

Holding plates of the endless belt can be loaded from the belt loader and folded one over the other in the storage. Simultaneously, the holding plates of the endless belt are unloaded one after another at the termination end of the folded form from the storage. The printed sheets of the photosensitive material are fed into the storage by the feeding means which operates in synchronization with loading of the belt loader and placed one by one between two adjacent holding plates of the endless belt at the start end of the folded form. At the same time, the printed sheets of the photosensitive material are released one by one from the two adjacent holding plates of the endless belt at the termination end of the folded form in the storage and delivered by the conveying means which operates in synchronization with unloading of the belt unloader to the development station. Accordingly, this photographic printing apparatus allows a number of the printed sheets of the photosensitive material to be temporarily held one by one between the two adjacent holding plates of the endless belt in the folded form, thus compensating for a time difference between the printing process and the developing process.

A number of the printed sheets of the photosensitive material can be fed one after another by the feeding means and held temporarily in the pausing means. The lowermost or uppermost one of the printed sheets of the photosensitive material in the pausing means is captured at the lower or upper side of its leading and trailing ends by suction of the suction heads and its leading end is moved downwardly or upwardly so that it can easily be separated from the remaining printed sheets. The leading end of the separated printed sheet of the photosensitive material is then nipped and drawn out from the pausing means by the conveying means and transferred further to the development station.

Accordingly, this photographic printing apparatus allows a number of the printed sheets of the photosensitive material to be temporarily held in a stack in the pausing means, thus compensating for a time difference between the printing process and the developing process. Also, the printed sheets of the photosensitive material can be separated one by one from their stack in the pausing means before being transferred to the development station.

A number of the printed sheets of the photosensitive material can be fed one after another by the feeding means and also held temporarily in the pausing means. Similarly, the lowermost or uppermost one of the printed sheets of the photosensitive material in the pausing means is captured at the lower or upper side of its leading and trailing ends by suction leading end heads and its leading end is moved downwardly or upwardly so that it can easily be separated from the remaining of the printed sheets. The leading end of the lowermost or uppermost one of the printed sheets is depressed to the separation assisting region thus allowing a flow of air to move into between the lowermost or uppermost sheet and its succeeding or preceding sheet. As a result, the lowermost or uppermost sheet can successfully be separated from the remaining printed sheets of the photosensitive material. The leading end of the separated printed sheet of the photosensitive material is then nipped and drawn out from the pausing means by the conveying means and transferred further to the development station. Accordingly, this photographic printing apparatus allows a number of the printed sheets of the photosensitive material to be temporarily held in a stack in the pausing means, thus compensating for a time difference between the printing process and the developing process. Also, the printed sheets of the photosensitive material can be separated one by one from their stack in the pausing means before being transferred to the development station.

The number of the printed sheets of the photosensitive material to be held temporarily is determined depending on the relation between the time interval required for replacing a negative film in the printing station and the efficiency of developing process in the development station, whereby the printed sheets can be transferred to the development station for the developing process during the time interval for negative film replacement. The number of the printed sheets of the photosensitive material to be held temporarily can be at least four. When the efficiency of developing process in the development station is substantially 1000 sheets per hour, the operation of the pause transfer device will be ideal. More specifically, while the time interval required for negative film replacement is about 15 seconds on average, although this depends on the skill of an operator, the developing process at 1000 sheets per hour can handle four sheets in 15 seconds. A difference caused by the time interval for film replacement will thus be compensated when four sheets are held temporarily. When the developing process exceeds 1000 sheets per hour, a difference will be compensated by increasing the number of the printed sheets of the photosensitive material to be temporarily held correspondingly to more than four with the time interval for replacement remaining unchanged. If the developing process has a rate less than 1000 sheets per hour, the number of the printed sheets to be held temporarily will be decreased, thus providing a generous margin of operation.

The number of the printed sheets of the photosensitive material to be held temporarily can be adjusted corresponding to an excess of the printed sheets over that which can be handled or processed by the development station. Accordingly, a minimum of the printed sheets of the photosensitive material can be held temporarily.

DETAILED DESCRIPTION OF THE PREFERRED EMBODIMENTS

First Embodiment

Figure 1:
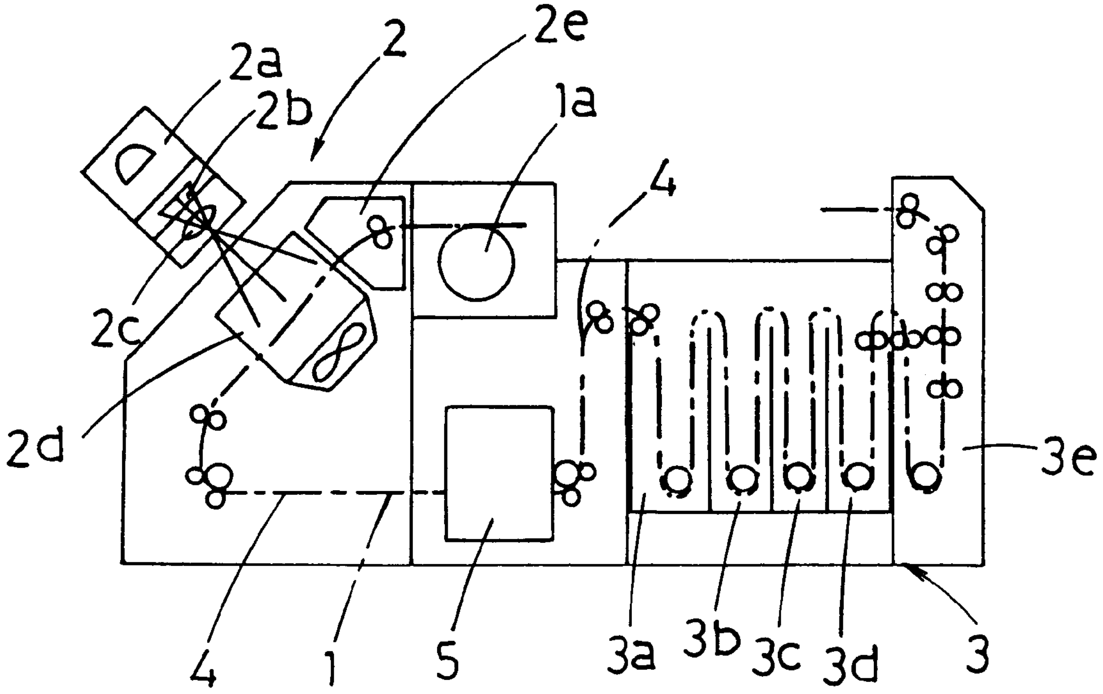
FIG. 1 is a schematic view of a photographic printing apparatus of a first embodiment of the present invention.

FIG. 1 is a schematic view of a photographic printing apparatus according to the present invention, which comprises a magazine 1*a* for storage of a roll of photosensitive material, a printing unit 2, a development unit 3, and a pause transfer device 5 disposed across a transfer passage 4 between the printing unit 2 and the development unit 3. The printing unit 2 is provided for printing images in a negative film on sheets of photosensitive material 1 supplied from a feeder 2*e* where the photosensitive material from its roll in the magazine 1*a* is cut into sheets of a printing size corresponding to images in the negative film. The printing unit 2 comprises in addition to the feeder 2*e* a light source 2*a*, a negative mask 2*b*, a lens assembly 2*c*, and an exposure device 2*d*. The light source 2*a* includes a lamp, a filter, and a diffusion box.

The development unit 3 subjects images are printed to a developing process. The development unit 3 comprises a developing tub 3*a* holding developer liquid bleach and fixing tub 3*b* holding bleach and fixer liquid, two stabilizing tubs 3*c* and 3*d* holding stabilizer liquid, and a dryer 3*e* for drying the developed photosensitive sheet 1.

The pause transfer device 5 is provided for temporarily holding an excess of the printed photosensitive sheets 1 which cannot be handled by the development unit 3. The printed photosensitive sheets 1 are fed by the pause transfer device 5 to the development unit 3 in synchronization with the developing process speed. The pause transfer device 5 comprises a pausing means 6 for temporarily holding the transfer movement of the photosensitive sheets 1, a feeding means 7 for feeding the photosensitive sheets 1 to the pausing means 6, and a conveying means 8 for releasing the photosensitive sheets 1 from the pausing means 6.

The pausing means 6 has grippers 6*c* mounted at given intervals to a carrier member in the form of a chain 6*b* which runs between two sprockets 6*a* and 6*d*. The grippers 6*c* are designed for displacing the photosensitive sheets 1 from a feeding location 9 to a transfer location 10. Each gripper 6*c* comprises a gripper arm 62*c* having a roller 63*c* urged by a spring in a gripping direction and a gripper body 61*c* to which the gripper arm 62*c* is pivotally mounted.

The feeding means 7 is disposed at the feeding location 9 of the pausing means 6 and comprises a drive roller 7*a*, a press roller 7*b*, a cam 7*c*, and a sensor 7*d* for detecting the photosensitive sheet 1. The movement of the press roller 7*b* along the peripheral edge of the drive roller 7*a* is controlled in synchronization with operation of the sprockets 6*a* and 6*d*.

The sensor 7*d* detects the leading end of each photosensitive sheet 1 supplied from the printing unit 2 and produces a detection signal which in turn instructs the drive roller 7*a* and the press roller 7*b* to nip therebetween the photosensitive sheet 1 and transfer it to the gripper 6*c*.

The conveying means 8 comprises a drive roller 8*a* and a sensor 8*b* and is located at the transfer location 10 of the pausing means 6.

The operation of the pause transfer device 5 for temporarily holding and transferring the printed photosensitive sheets 1 to the development unit 3 is as follows:

(1) A gripper 6*c* is moved to the feeding location 9 by operation of the sprocket 6*a* and its arm 62*c* is opened by the movement of the cam 7*c*.

Figure 3:
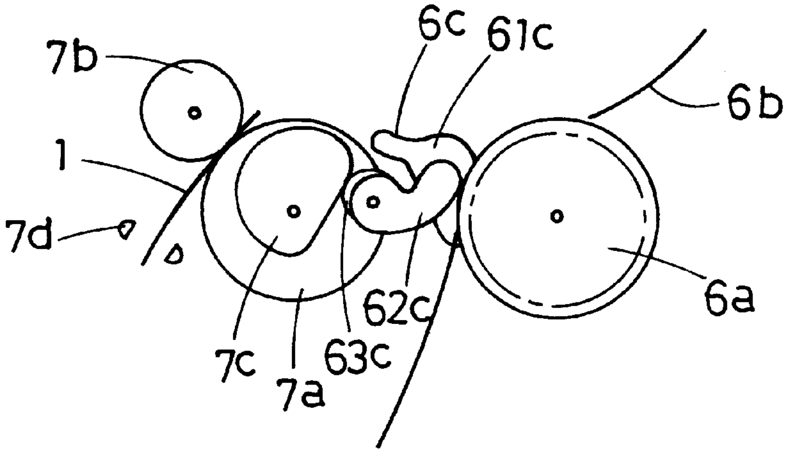
FIGS. 3 to 6 are explanatory views showing operation of the pause transfer device in the first embodiment.

(2) In response to the detection signal from the sensor 7*d*, the press roller 7*b* is advanced close to the sensor 7*d* so that the leading end of a photosensitive sheet 1 is nipped between the drive roller 7*a* and the press roller 7*b* (FIG. 3).

Figure 4:
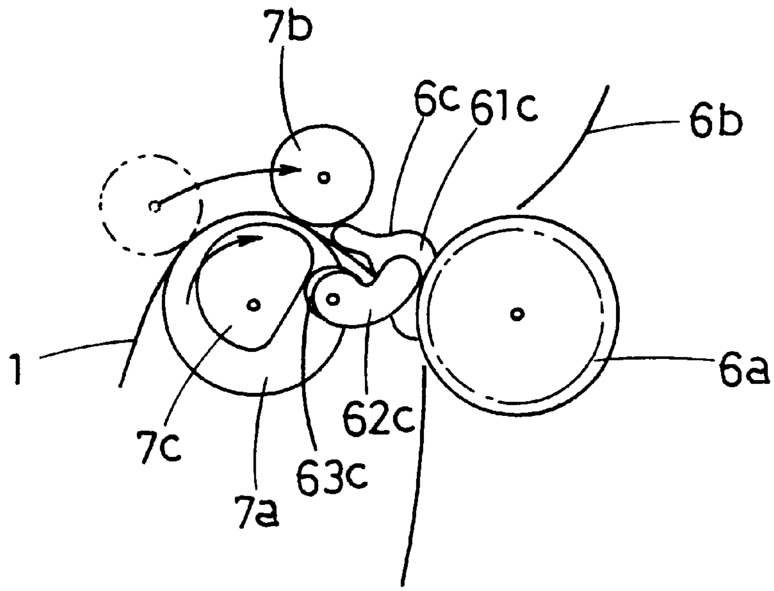

(3) With the photosensitive sheet 1 being nipped, the drive roller 7*a* is rotated and the press roller 7*b* is moved to the gripper 6*c* until the leading end of the photosensitive sheet 1 is accepted in the gripper 6*c* (FIG. 4).

Figure 5:
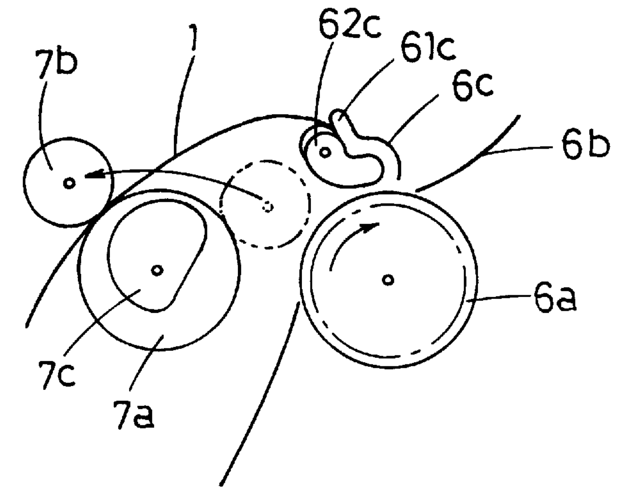

(4) Upon the leading end of the photosensitive sheet 1 reaching the gripper 6*c* as detected by the sensor 7*d*, the sprocket 6*a* is turned by a predetermined angle to release the gripper arm 62*c* from the cam 7*c* so that the leading end of the photosensitive sheet 1 is gripped between the arm 62*c* and the body 61*c* of the gripper 6*c*. Meanwhile, the press roller 7*b* is returned back (to its original location) near the sensor 7*d* (FIG. 5).

Figure 6:
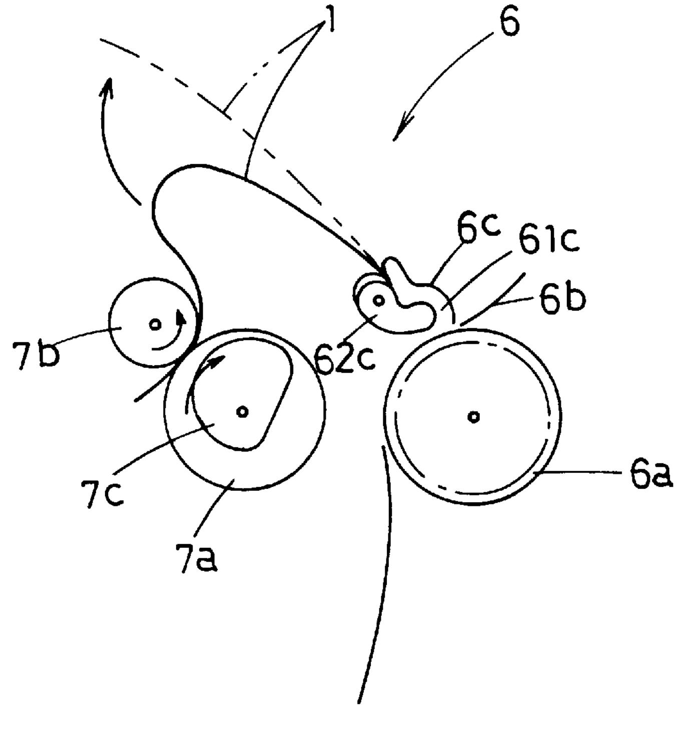

(5) The drive roller 7*a* is rotated again to pass the trailing end of the photosensitive sheet 1 to the pausing means 6 (FIG. 6).

(6) By repeating the feeding of photosensitive sheets 1 to the grippers 6*c*, a desired number of the photosensitive sheets 1 are held in the pausing means 6. During the feeding operation, the tension of the chain 6*b* is maintained constantly by movements 61*b* and 62*b* of adjusting sprockets 6*e* and 6*f*, respectively.

Figure 2:
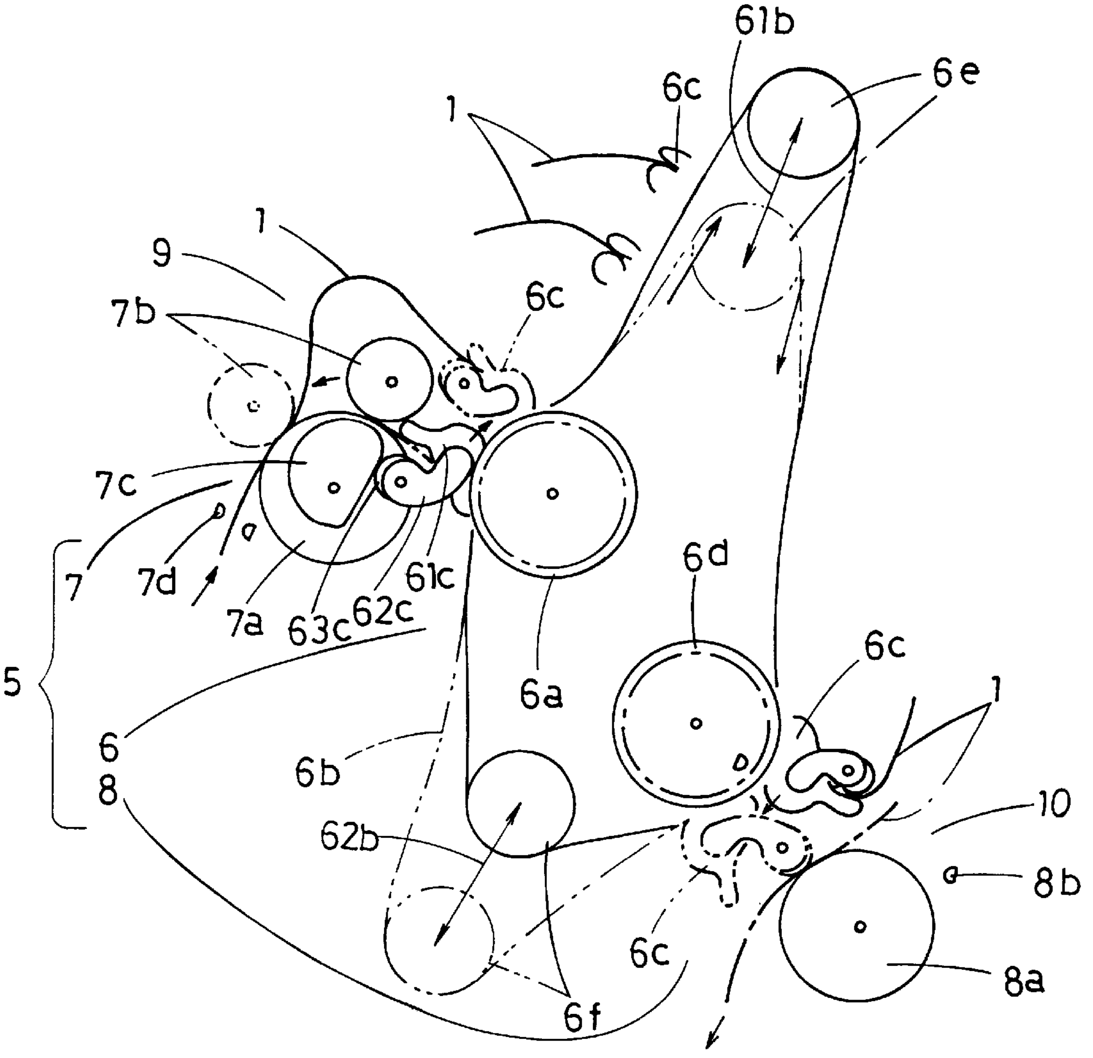
FIG. 2 is a front view of a pause transfer device in the first embodiment.

(7) At the transfer location 10 of the pausing means 6, the gripper arm 62*c* of the gripper 6*c* is opened by operation of the drive roller 8*a* to release the photosensitive sheet 1 (FIG. 2). More particularly, the rotation of the sprocket 6*d* is stopped at a desired position in response to a detection signal of the sensor 8*b* indicative of arrival of the photosensitive sheet 1. The photosensitive sheet 1 is then held between the roller 63*c* of the gripper arm 62*c* and the drive roller 8*a*. As the drive roller 8*a* rotates, the photosensitive sheet 1 is transferred towards the development unit 3 (FIG. 2). Upon the sensor 8*b* detecting the trailing end of the photosensitive sheet 1, its detection signal actuates the sprocket 6*d* to rotate again so that the succeeding gripper 6*c* advances to the transfer location 10 of the pausing means 6 for repeating the same transfer operation.

(8) By repeating a series of the prescribed operations, any desired number of the photosensitive sheets 1 are temporarily held and transferred in succession to the development unit 3 where they are subjected to the developing process.

The time required for movement of the grippers 6*c* from the feeding location 9 to the transfer location 10 and the number of the grippers 6*c* are determined depending on the processing capabilities of the printing unit 2 and the development unit 3.

Second Embodiment

A photographic printing apparatus of this embodiment is identical in construction of the printing unit and the development unit to that of the first embodiment. The pause transfer device 5 between the printing unit and the development unit is however modified as shown in FIGS. 7 and 8.

Figure 7:
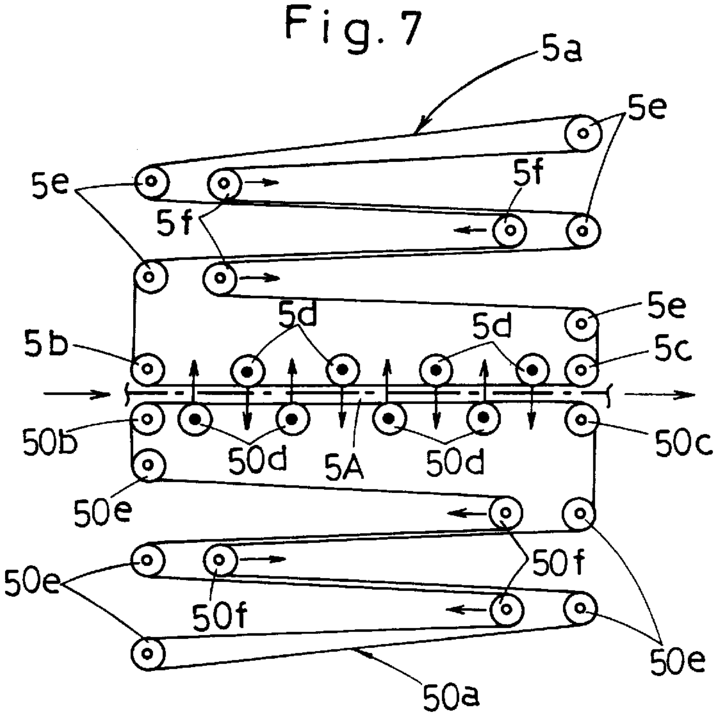
FIG. 7 is a front view of a photographic printing apparatus of a second embodiment of the present invention.
Figure 8:
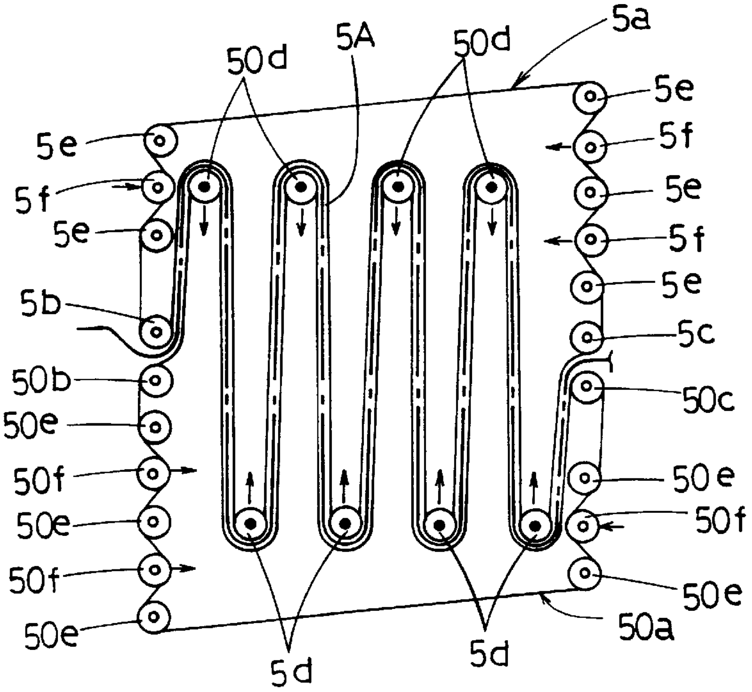
FIG. 8 is an explanatory view showing operation of a pause transfer device in the second embodiment.

FIG. 7 shows the entire pause transfer device 5 in which a transfer path 5A is produced between a pair of transfer belts 5*a* and 50*a* disposed opposite to each other for transferring a succession of the photosensitive sheets 1. The transfer belts 5*a* and 50*a* are mounted to run along drive rollers 5*b* and 50*b* disposed at the printing unit 2 side, drive rollers 5*c* and 50*c* disposed at the development unit 3 side, transfer rollers 5*d* and 50*d* disposed between their respective drive rollers 5*b*, 5*c*, 50*b* and 50*c*, stationary rollers 5*e* and 50*e* disposed outside of the transfer path 5A, and movable tensioning rollers 5*f* and 50*f*, respectively. The transfer rollers 5*d* and 50*d* and the tensioning rollers 5*f* and 50*f* are movable in the directions denoted by the arrows in FIGS. 7 and 8. When the rollers 5*d*, 50*d*, 5*f*, and 50*f* are at their home positions, the length of the transfer path 5A is minimum. The transfer belts 5*a* and 50*a* are driven by the rollers 5*b*, 5*c*, 50*b* and 50*c*, respectively and their running speeds can be controlled independently.

When an initial one of the printed photosensitive sheets 1 is transferred from the printing unit 2 to the development unit 3, the length of the transfer path 5A is kept minimum for passing the photosensitive sheet 1 to the development unit 3 within a minimum length of time. As the initial photosensitive sheet 1 is being fed into the development unit 3, the drive rollers 5*c* and 50*c* are rotated at the same speed as the processing speed in the development unit 3.

When the number of the photosensitive sheets 1 processed in the printing unit 2 is increased, the rotation of the drive rollers 5*b* and 50*b* at the printing unit 2 side is increased and becomes faster than the rotation of the drive rollers 5*c* and 50*c* at the development unit 3 side. For compensation, the transfer rollers 5*d* and 50*d* and the tensioning rollers 5*f* and 50*f* are displaced in the directions denoted by the arrows in FIG. 7. Accordingly, the transfer path becomes serpentine and the length of the transfer path 5A is increased thus holding a larger number of the photosensitive sheets 1 (FIG. 8). In this manner, the transfer of the printed photosensitive sheets 1 to the development unit 3 is controlled depending on the speed of the developing process.

When the feeding of the photosensitive sheets 1 from the printing unit 2 is exhausted, the drive rollers 5*b* and 50*b* stop their movements while the drive rollers 5*c* and 50*c* at the development unit 3 side remain rotating. This causes the transfer rollers 5*d* and 50*d* and the tensioning rollers 5*f* and 50*f* to move back in the directions denoted by the arrows in FIG. 8 until the length of the transfer path 5A becomes minimum (FIG. 7). Upon the length of the transfer path 5A being minimized, the drive rollers 5*b* and 50*b* at the printing unit 2 side again start rotating at the same speed as the drive rollers 5*c* and 50*c*.

As shown in FIGS. 7 and 8, equal effects may be achieved without use of the stationary rollers 5*e* and 50*e* and the tensioning rollers 5*f* and 50*f*.

Third Embodiment

A photographic printing apparatus of the third embodiment is identical in construction of the printing and development units to that of the first embodiment. The pause transfer device 5 between the printing unit and the development unit is however modified as shown in FIGS. 9 to 13.

Figure 9:
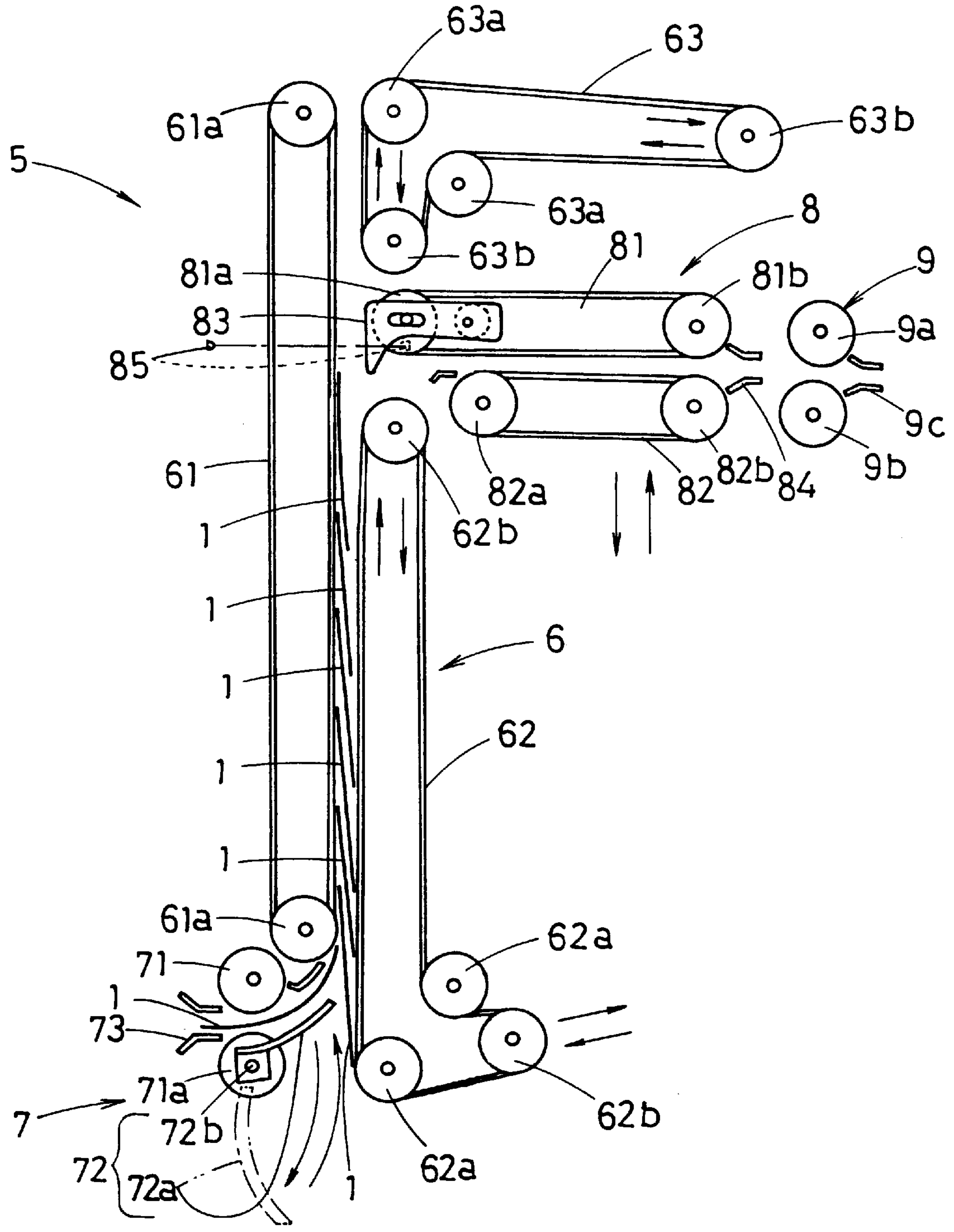
FIG. 9 is a front view of a photographic printing apparatus of a third embodiment of the present invention.

The pause transfer device 5 of this embodiment comprises a pausing means 6 for temporarily holding a number of the printed photosensitive sheets 1 while carrying them, a feeding means 7 for feeding the photosensitive sheets 1 to the pausing means 6, a conveying means 8 for transferring the photosensitive sheets 1 from the pausing means 6 to the development unit 3, and a supplemental transfer means 9 (FIG. 9).

The pausing means 6 comprises a set of transfer belts arranged opposite to each other. Provided at one side is a first transfer belt 61. At the other side, a second transfer belt 62 and a third transfer belt 63 are disposed to run in an L shape. The first transfer belt 61 is mounted between two stationary rollers 61*a*. The second and third transfer belts 62, 63 are mounted to run along stationary rollers 62*a* and 63*a*, respectively and are tensioned by movable tensioning rollers 62*b* and 63*b*, respectively. As the movable tensioning rollers 62*b* and 63*b* move in the directions denoted by the arrows, the respective transfer belts 62 and 63 are displaced. The movements of the transfer belts 61, 62, and 63 are controlled in synchronization with the running speed of the printed photosensitive sheets 1 from the printing unit 2.

The feeding means 7 comprises a drive roller 71, a press roller 71*a*, a guide 72, and a feed inlet 73. The guide 72 is designed for guiding a photosensitive sheets 1 from the feed inlet 73 to the entrance of the pausing means 6. The guide 72 has an arcuate guide plate 72*a* thereof which is mounted pivotally at a proximal end to a shaft 72*b* adjacent to the feed inlet 73 and is actuated by a swinging means (not shown) for pivotal movement in the directions denoted by the arrows in FIG. 9.

The conveying means 8 comprises two, upper and lower, transfer belts 81 and 82 mounted between rollers 81*a*, 81*b*, 82*a* and 82*b*, respectively. Roller 81*a*, at the loading side of the transfer belt 81 is linked to a separation arm 83 mounted for horizontal movement to and from the first transfer belt 61. There is provided a discharge outlet 84 at the unloading side of the two transfer belts 81 and 82. The conveying means 8 also includes a sensor 85 for detecting the loading of the photosensitive sheets 1. The conveying means 8 is adjustable in height by a lifting means (not shown), and at its highest position discharge output 84 comes is at the same height as the transfer supplemental means 9.

The transfer supplemental means 9 comprises a drive roller 9*a*, a press roller 9*b*, and a transfer outlet 9*c*.

The operation of the pause transfer device 5 is as follows:

(1) For feeding a printed photosensitive sheet 1 from the printing unit 2 into the pausing means 6, the guide plate 72*a* is turned to its substantially horizontal position denoted by the real lines in FIG. 9 for guiding sheet 1 until the leading end of the photosensitive sheet 1 moves into between the first transfer belt 61 and the second transfer belt 62. After the feeding of the photosensitive sheet 1 is completed, the guide plate 72*a* is turned down as denoted by the two-dot chain lines in FIG. 9 so that the trailing end of the photosensitive sheet 1 hangs down.

(2) Then, the guide plate 72*a* is turned up to its substantially horizontal position again to feed a succeeding photosensitive sheet 1 into between the first transfer belt 61 and the second transfer belt 62. As the guide plate 72*a* has been returned, the succeeding photosensitive sheet 1 is held with its trailing end down.

(3) By repeating the above operations, a desired number of the photosensitive sheets 1 are held overlapped one after another between the first transfer belt 61 and the second transfer belt 62 during upward movement. The overlap between two adjacent photosensitive sheets 1 may be 5 mm or more.

Figure 10:
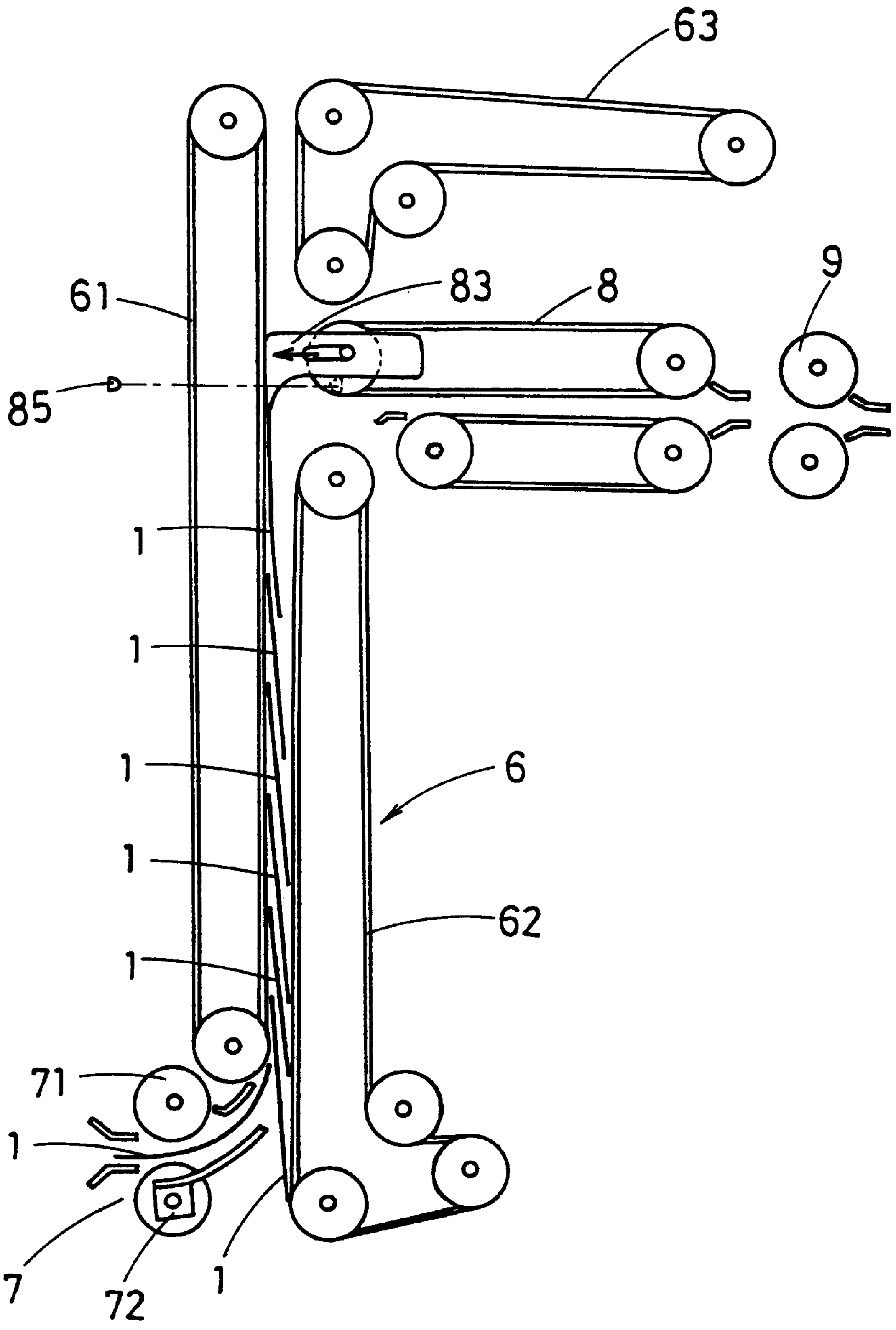
FIGS. 10 to 13 are explanatory views showing operation of the pause transfer device in the third embodiment.

(4) When a photosensitive sheet 1 reaches the conveying means 8, its leading end is detected by the sensor 85 which in turn produces a detection signal. In response to the detection signal, the separation arm 83 is moved towards the transfer belt 61 until it is positioned above the leading end of the photosensitive sheet 1 (FIG. 10).

Figure 11:
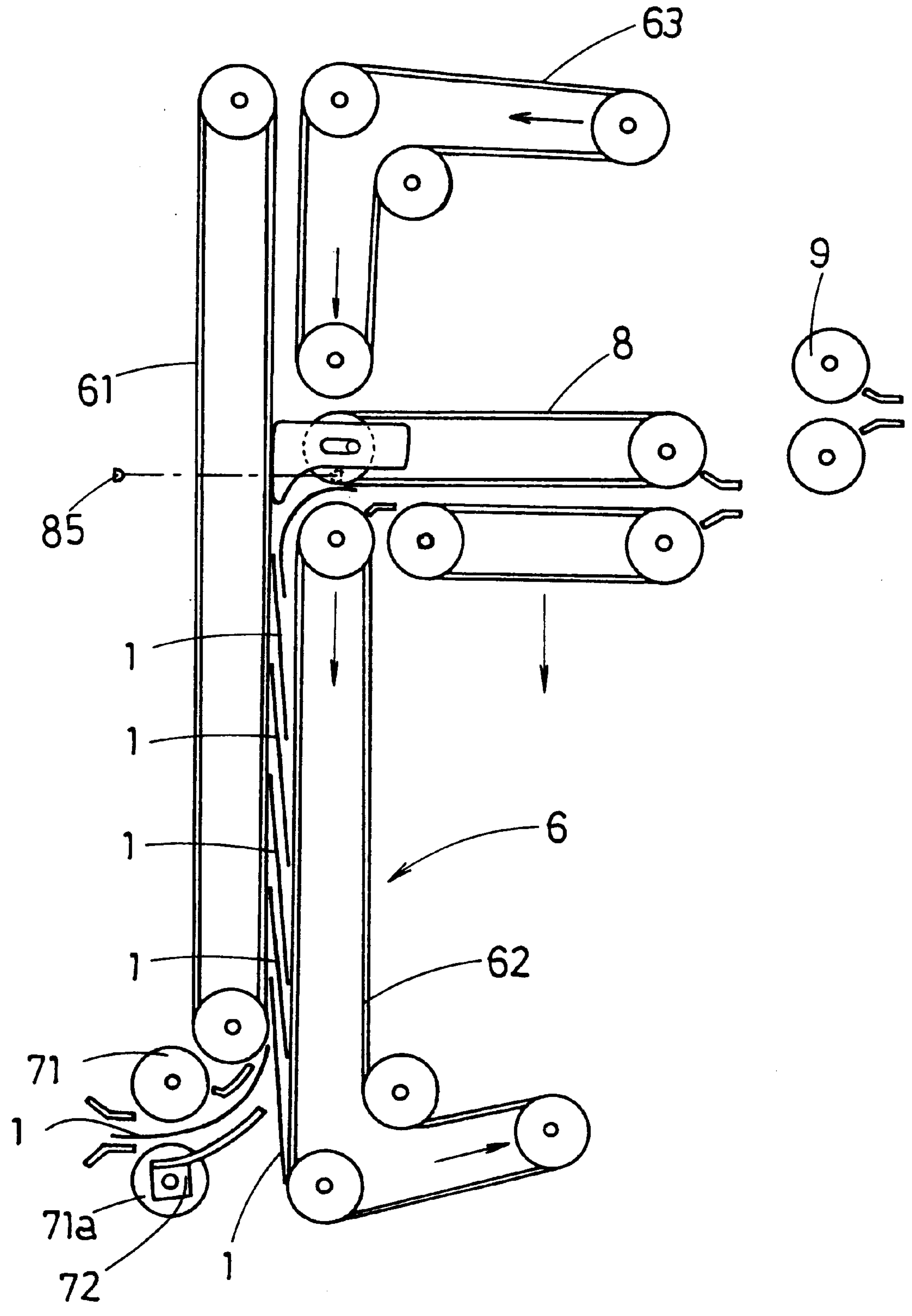

(5) The conveying means 8 with its separation arm 83 being extracted is then lowered to deflect the leading end of the photosensitive sheet 1 towards the loading end of the conveying means 8 (FIG. 11).

Figure 12:
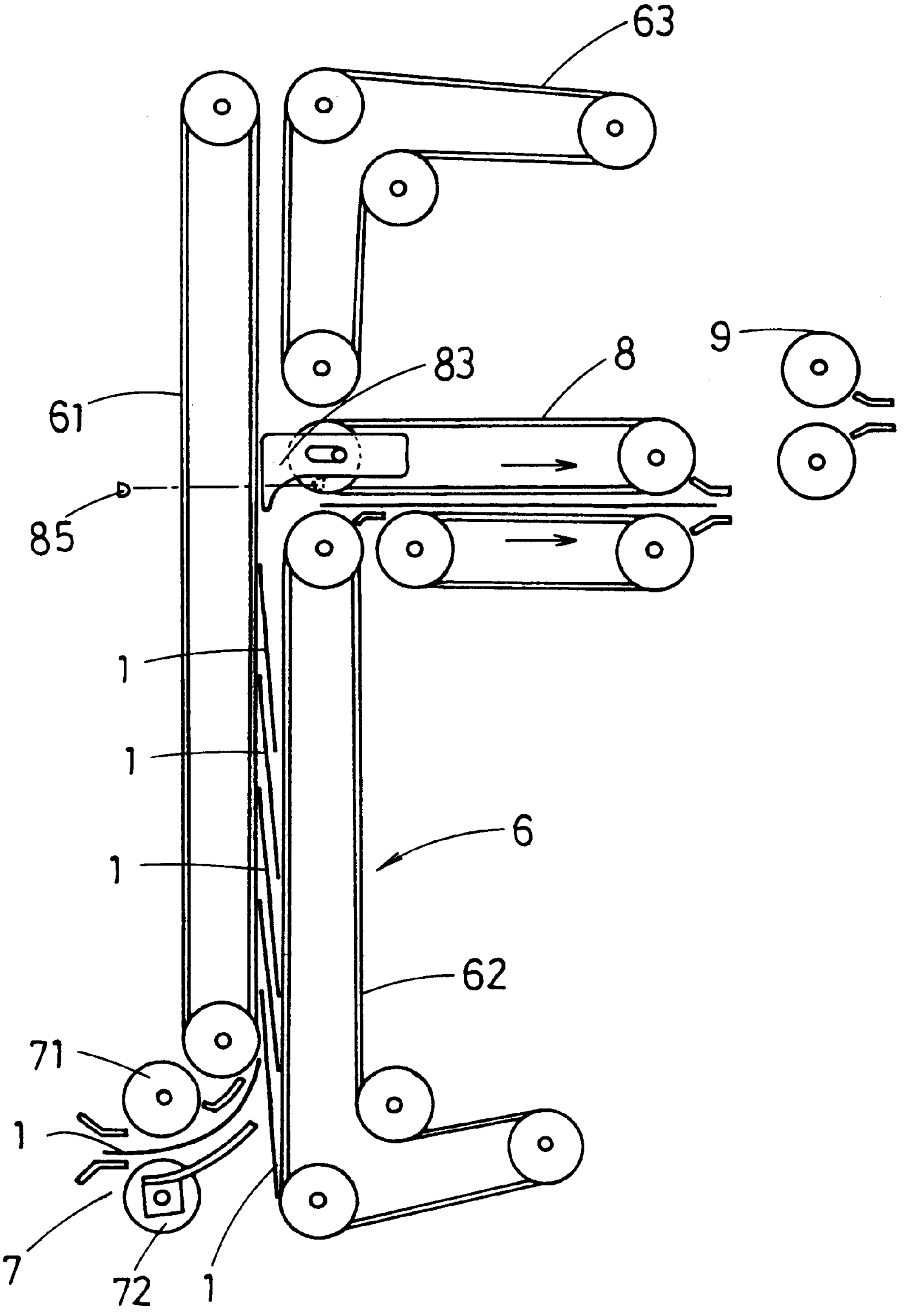

(6) As the separation arm 83 is retracted, the conveying means 8 is driven to feed the photosensitive sheet 1 into between the two, upper and lower, belts 81 and 82 (FIG. 12).

Figure 13:
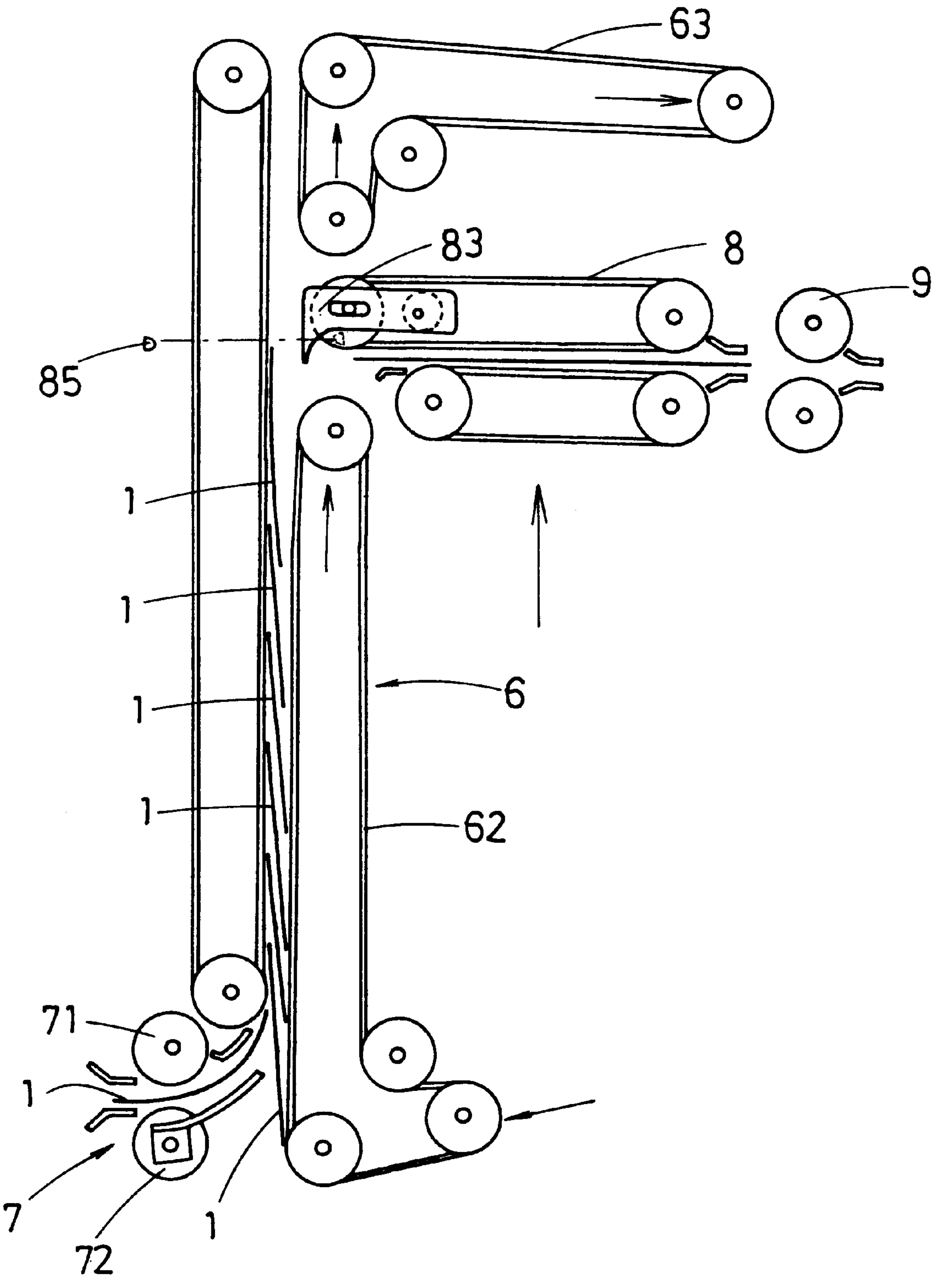

(7) After the movement of the two transfer belts 81 and 82 is stopped, the conveying means 8 is lifted up to its highest position. The photosensitive sheet 1 is then carried to the development unit 3 by the conveying means 8 and the supplemental transfer means 9 (FIG. 13).

(8) By repeating the prescribed operations, the desired number of photosensitive sheets 1 are held temporarily before being transferred to the development unit 3 for the developing process.

The overlap between two adjacent photosensitive sheets 1 and the transferring speed of the transfer belts 61, 62, and 63 can be controlled depending on the number of the photosensitive sheets 1 in the pause transfer device 5.

Fourth Embodiment

A photographic printing apparatus of the fourth embodiment is identical in construction of the printing and development units to that of the first embodiment. The pause transfer device 5 between the printing unit and the development unit is however modified as shown in FIGS. 14 and 15.

Figure 14:
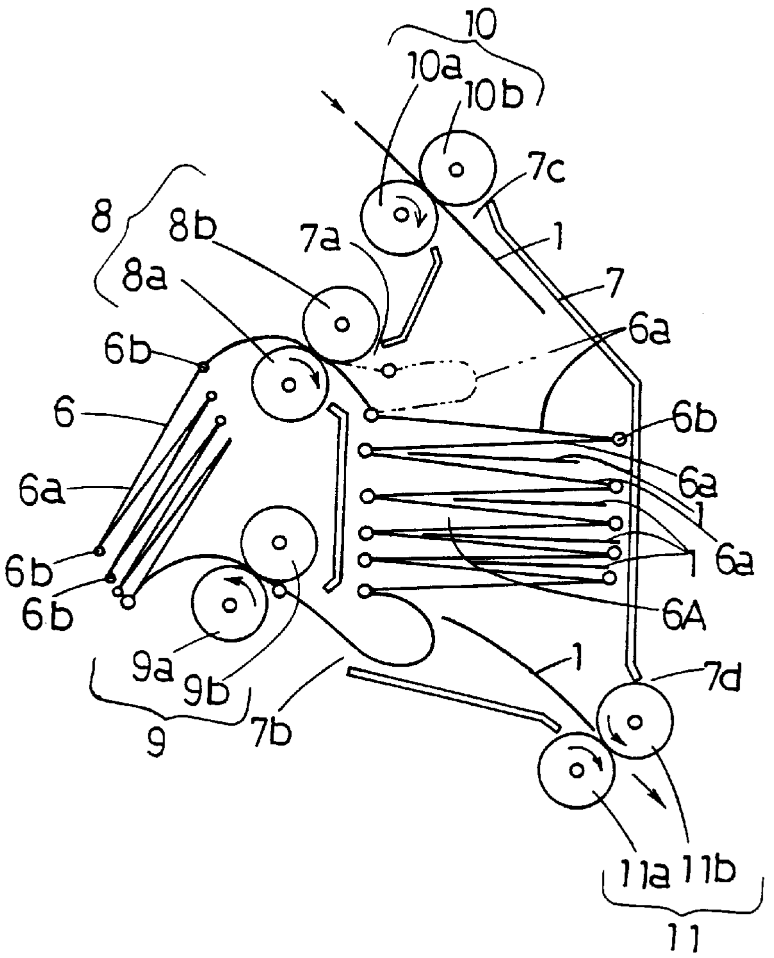
FIG. 14 is a front view of a photographic printing apparatus of a fourth embodiment of the present invention.
Figure 15:
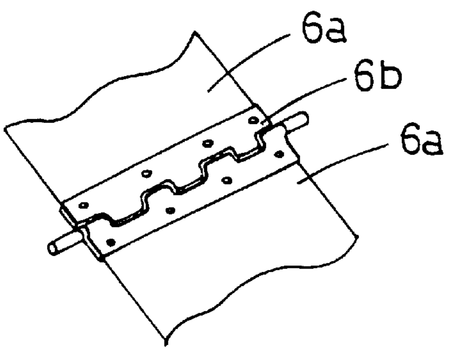
FIG. 15 is an enlarged perspective view showing a portion of the fourth embodiment.

FIG. 14 illustrates the entire arrangement of the modified pause transfer device 5. Denoted by 6 is an endless belt 6 comprising a multiplicity of holding plates 6*a* arranged foldably one over the other at hinges 6*b* (FIG. 15). The holding plates 6*a* are made of a resilient synthetic resin material. The length and width of each holding plate 6*a* are determined corresponding to the size of a maximum sized print sheet.

The endless belt 6 is partially stored in its folded form in a housing 7 while the remaining portion thereof is folded and seated outside the housing 7 for standby. The housing 7 has an inlet 7*a* and an outlet 7*b* through which the endless belt 6 runs. It also includes an inlet 7*c* and an outlet 7*d* for loading and unloading of the photosensitive sheets 1.

At the belt inlet 7*a* is disposed a belt loader 8 which comprises a drive roller 8*a* and a press roller 8*b*.

Similarly, a belt unloader 9 which comprises a drive roller 9*a* and a press roller 9*b* is mounted at the belt outlet 7*b*.

Also, at the inlet 7*c* for the photosensitive sheets 1, is disposed a loader mean 10 which comprises a drive roller 10*a* and a press roller 10*b*. The loader means 10 is controlled to actuate in synchronization with the loading operation of the belt loader 8 for feeding from above and sandwiching a photosensitive sheet 1 between two holding plates 6*a* of a stored portion 6A of the endless belt 6 in the housing 7.

There is an unloader means 11 which comprises a drive roller 11*a* and a press roller 11*b* and is provided at the outlet 7*d* for the photosensitive sheets 1. The unloader means 11 is controlled to actuate in synchronization with the unloading operation of the belt unloader 9 for drawing out a photosensitive sheet 1 from between the two holding plates 6*a* of the stored portion 6A of the endless belt 6 in the housing 7 and transferring it to the development unit 3.

In the pause transfer device 5, the holding plates 6*a* of the endless belt 6 are folded as they traveled and are stored partially in the housing 7. More specifically, the holding plates 6*a* of the stored portion 6A of the endless belt 6 before being moved to their folded form outside the housing 7 are moved out from the housing 7 individually, lowermost plate first.

Meanwhile, a succession of the printed photosensitive sheets 1 from the printing unit 2 are fed into the housing 7 in synchronization with the loading operation of the belt loader 8 so that each of them is sandwiched between two respective adjacent holding plates 6*a* of the stored portion 6A of the endless belt 6. The photosensitive sheets 1 are then drawn out one by one from the lowermost of the holding plates 6*a* of the stored portion 6A of the endless belt 6 in the housing 7 and transferred to the development unit 3.

Fifth Embodiment

Figure 17:
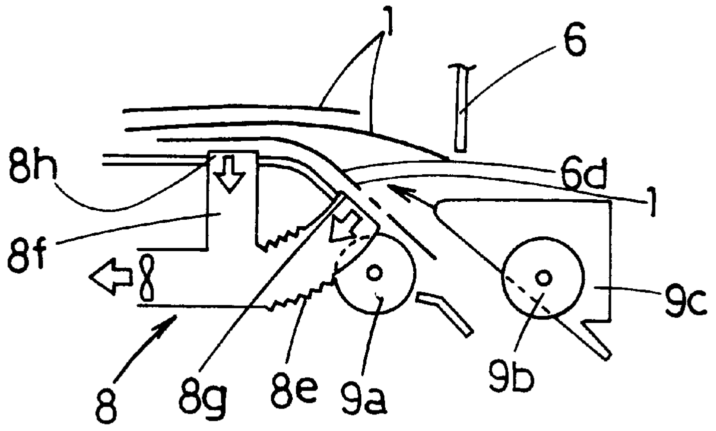
FIGS. 17 and 18 are explanatory views showing operation of a pause transfer device in the fifth embodiment.
Figure 18:
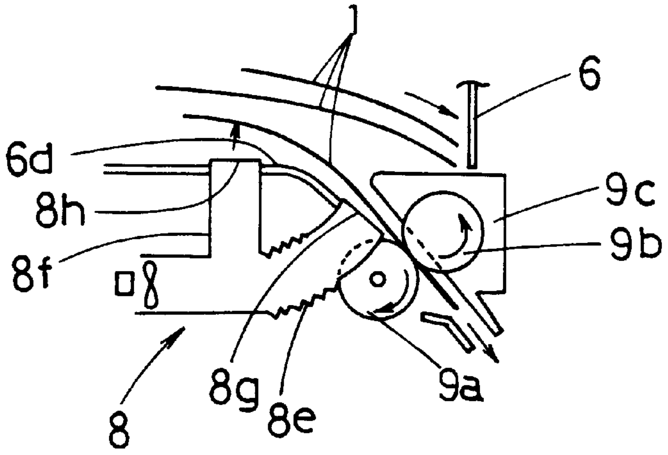

A photographic printing apparatus of the fifth embodiment is identical in construction of the printing and development units to that of the first embodiment. The pause transfer device 5 between the printing unit and the development unit is however modified as shown in FIGS. 16 to 18.

Figure 16:
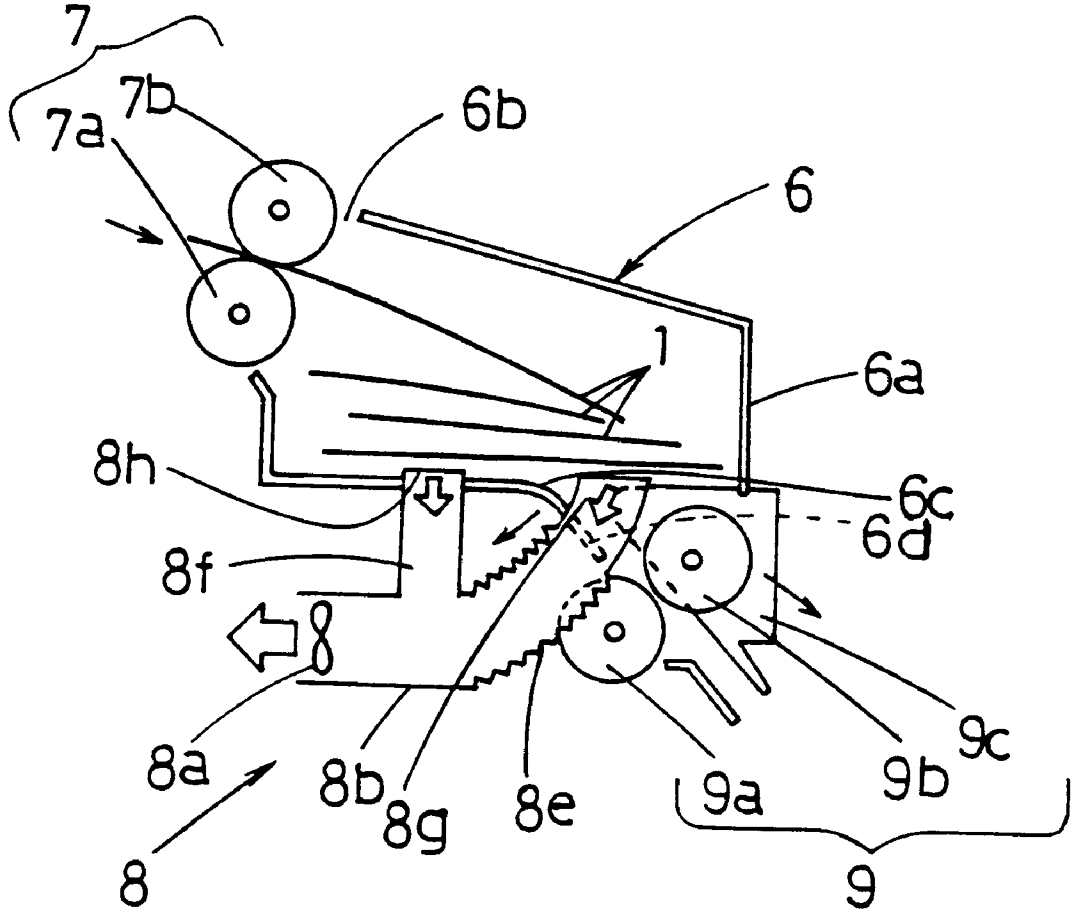
FIG. 16 is a front view of a photographic printing apparatus of a fifth embodiment of the present invention.

The modified pause transfer device 5 comprises a pausing means 6, a feeding means 7, a separating means 8, and a conveying means 9 (FIG. 16).

The pausing means 6 includes a housing 6*a* having an inlet 6*b* and an outlet 6*c* for temporarily storing a number of the photosensitive sheets 1 in a stack. There is a downwardly sloping plate 6*d* mounted at the outlet 6*c* for guiding the photosensitive sheet 1 in a curve. Also, the feeding means 7 is disposed at the inlet 6*b* and the conveying means 9 is located at the outlet 6*c* of the pausing means 6. The housing 6*a* has a bottom that is tilted at one end (on the right in FIG. 16) for ease of receipt of the photosensitive sheets 1 one over the other.

The feeding means 7 is designed for feeding the photosensitive sheets 1 into the pausing means 6 and comprises a drive roller 7*a* and a press roller 7*b*.

The separating means 8 is adapted to separate the lowermost sheet from a stack of the photosensitive sheets 1 stored in the housing 6*a*. More specifically, the separating means 8 comprises a suction duct 8*b* containing a suction fan 8*a* and having branch ducts 8*e* and 8*f* extending respectively from a far region and a near region of the bottom of the housing 6*a* of the pausing means 6. The branch ducts 8*e* and 8*f* have suction heads 8*g* and 8*h*, respectively, provided at the far ends thereof. The branch duct 8*e* may be formed as bellows for extension and contraction. Its suction head 8*g* is arranged for to be included downwardly or retracted by a pulling means (not shown). The suction heads 8*g* and 8*h* at the far and near regions are located to match the smallest size of the photosensitive sheets 1.

The conveying means 9 is adapted for drawing out from the pausing means 6 the leading end of a photosensitive sheet 1 separated by the separating means 8 and feeding it to the development unit 3. The conveying means 9 comprises a drive roller 9*a*, a press roller 9*b*, and a transfer guide 9*c*. The transfer guide 9*c* is retractably mounted by a drawing means (not shown) to inclined plate 6*d* of the housing 6*a* of the pausing means 6. The press roller 9*b* is integrally joined to the transfer guide 9*c*.

The operation of the pause transfer device 5 is as follows:

(1) A succession of the photosensitive sheets 1 from the printing unit 2 are fed by the feeding means 7 into the housing 6*a* of the pausing means 6 where they are placed one over the other for temporary storage (FIG. 16).

(2) The lowermost one of the photosensitive sheets 1 is then sucked at far and near ends with the suction heads 8*g* and 8*h* and grasped thereby (FIG. 16). Simultaneously, while the transfer guide 9*c* and the press roller 9*b* are moved backwardly, the suction head 8*g* at the far end is downwardly retracted to pull the leading end of the lowermost photosensitive sheet 1 up to the sloping or inclined plate 6*d* of the pausing means 6 (FIG. 16). The trailing end of the photosensitive sheet 1 is held by the suction of the suction head 8*h* at the near end and thus is not lifted up, thus prevent slipping down of the succeeding photosensitive sheet 1. Accordingly, the leading end of the lowermost photosensitive sheet 1 will successfully be separated from the stack of the photosensitive sheets 1.

(3) The transfer guide 9*c* and the press roller 9*b* are then returned to their original positions so that the lowermost photosensitive sheet 1 is held between the press roller 9*b* and the drive roller 9*a*. As the transfer guide 9*c* is advanced, it comes between the lowermost photosensitive sheet 1 and the stack of the photosensitive sheets 1 (FIG. 17). Finally, the suction of the suction heads 8*g* and 8*h* is terminated and the drive roller 9*a* with the press roller 9*b* is actuated to transfer the photosensitive sheet 1 to the development unit 3 (FIG. 18).

Sixth Embodiment

Figure 20:
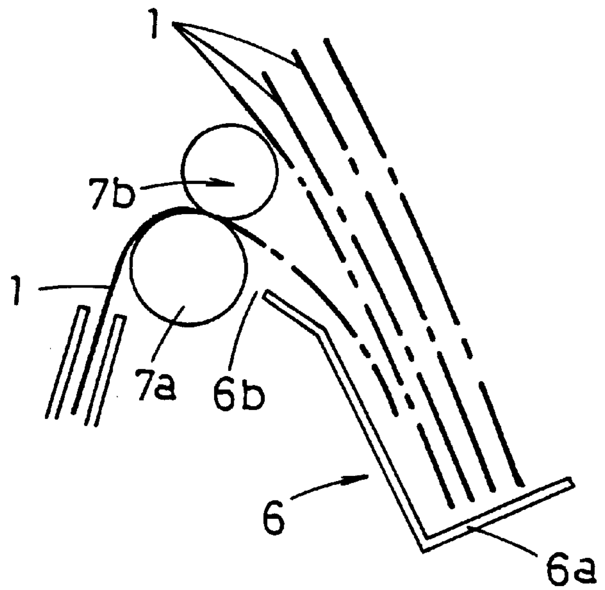
FIGS. 20 and 21 are explanatory views showing operation of a pause transfer device in the sixth embodiment.
Figure 21:
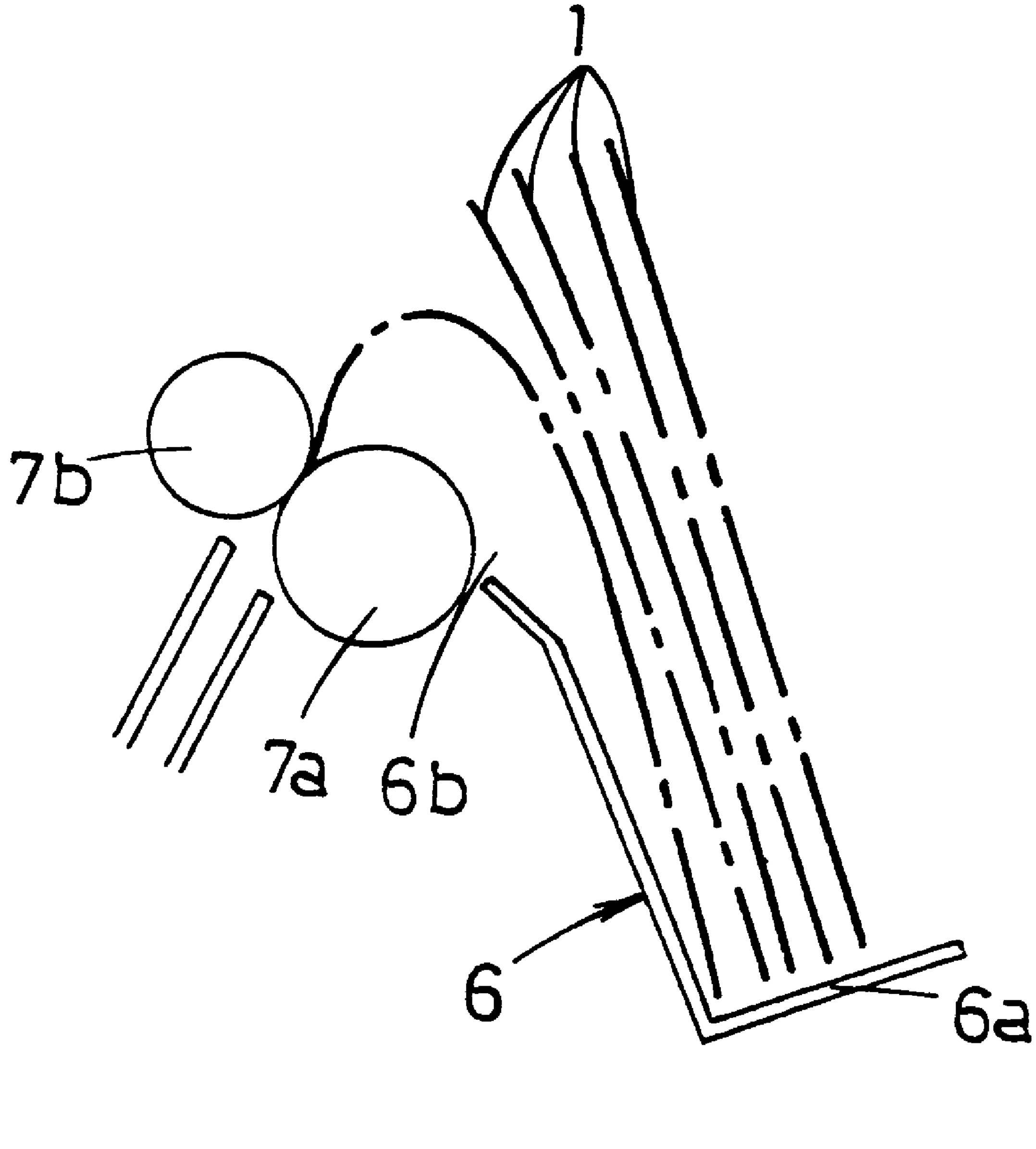

A photographic printing apparatus of the sixth embodiment is identical in construction of the printing and development units to that of the first embodiment. The pause transfer device 5 between the printing unit and the development unit is however modified as shown in FIGS. 19 to 21.

Figure 19:
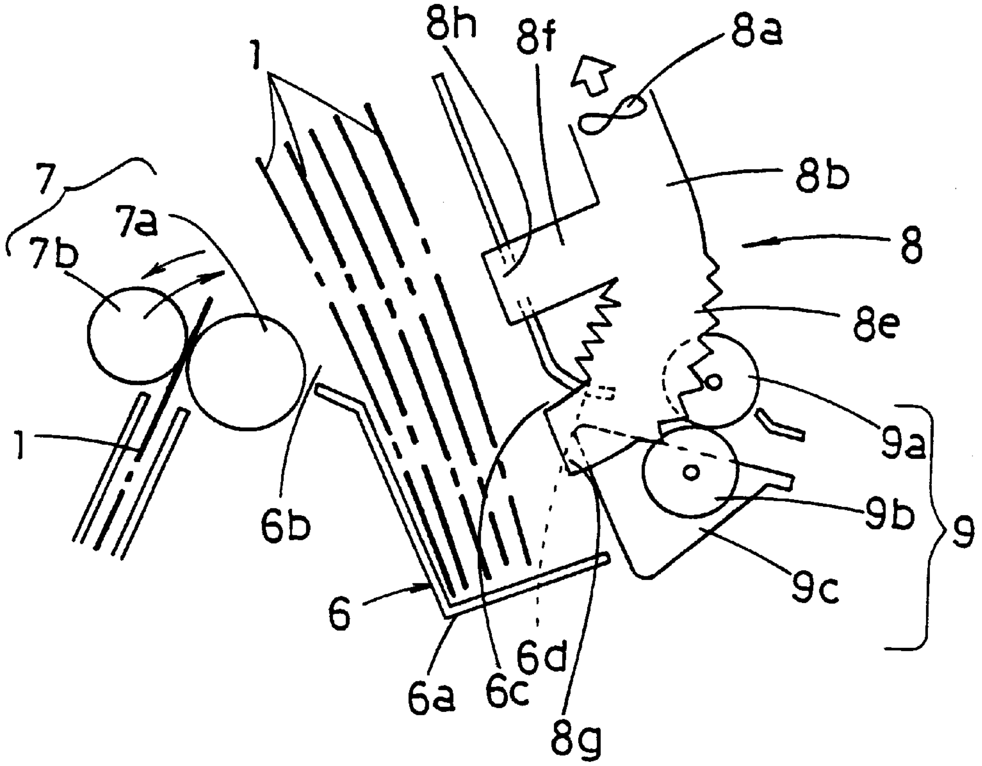
FIG. 19 is a front view of a photographic printing apparatus of a sixth embodiment of the present invention.

The modified pause transfer device 5 comprises a pausing means 6, a feeding means 7, a separating means 8, and a conveying means 9 (FIG. 19).

The operation of the pause transfer device 5 of this embodiment is similar to that of the fifth embodiment where the photosensitive sheets 1 are stored in a stack. The sixth embodiment is different from the fifth embodiment by the fact that the photosensitive sheets 1 are placed one after another from beneath and are delivered from the uppermost one of them to the development unit 3.

The pausing means 6 is adapted for accumulating the photosensitive sheets 1 in a tilted alignment in a housing 6*a*. The housing 6*a* has an inlet 6*b* provided at an upper side thereof and an outlet 6*c* provided at a lower opposite side thereof. Also, a curved plate 6*d* is mounted to extend downwardly in an inclined manner toward outlet 6*c* for guiding the discharge of the photosensitive sheets 1.

The feeding means 7 is disposed at the inlet 6*b* of the housing 6*a*. The outlet 6*c* is communicated with the conveying means 9. The feeding means 7 comprises a drive roller 7*a* and a press roller 7*b* between which each of the photosensitive sheets 1 is nipped and carried. The forward and backward movement of the press roller 7*b* along the peripheral edge of the driver roller 7*a* is controlled in directions denoted by the arrows. More specifically, as one of the photosensitive sheets 1 from the printing unit 2 is approaching, the press roller 7*b* remains opposite to the inlet 6*b* of the pausing means 6 to catch the leading end of the photosensitive sheet 1 (FIG. 19). Then, the press roller 7*b* is moved towards the inlet 6*b* in synchronization with the rotation of the drive roller 7*a*, thus to carry the photosensitive sheet 1 to the inlet 6*b* of the pausing means 6. The press roller 7*b* is returned back to the position opposite to the inlet 6*b* for catching the succeeding photosensitive sheet 1.

The separating means 8 is designed for separating the uppermost one from the stack of the photosensitive sheets 1 stored in the housing 6*a* of the pausing means 6. The separating means 8 comprises a suction duct 8*b* provided with a suction fan 8*a*, branch ducts 8*e* and 8*f* extending from the suction duct 8*b* to the housing 6*a* of the pausing means 6, and suction heads 8*g* and 8*h* mounted to the opening ends of the branch ducts 8*e* and 8*f*, respectively. The branch duct 8*e* is formed as a bellows for extension and retraction, and its suction head 8*g* is disposed outside the housing 6*a* by retract operation of a drawing means (not shown). The two suction heads 8*g* and 8*h* are located to match the dimensions of a smallest sized one of the photosensitive sheet 1.

The conveying means 9 is identical in operational function to that of the fifth embodiment and will be explained in no more detail, where like components are denoted by like numerals.

The operation of the pause transfer device 5 of the sixth embodiment is as follows:

(1) The leading end of the photosensitive sheet 1 from the printing unit 2 is nipped between the press roller 7*b* and the drive roller 7*a* (FIG. 19) and then is dragged to the inlet 6*b* of the pausing means 6 (FIG. 20). Upon the press roller 7*b* reaching a point adjacent to the inlet 6*b*, it lifts up the trailing end of the preceding photosensitive sheet 1 in the housing 6*a* (FIG. 20). As the photosensitive sheet 1 is carried by operation of the drive roller 7*a*, its leading end moves into a lowermost stacked position of the housing 6*a* of the pausing means 6.

(2) The press roller 7*b* is then returned to it original position so that the trailing end of the photosensitive sheet 1 is fed by operation of the driver roller 7*a* into the housing 6*a* of the pausing means 6.

(3) By repeating the above operations, the photosensitive sheets 1 are successively accumulated in the housing 6*a*, thus forming a stack.

(4) The uppermost one of the photosensitive sheets 1 in the housing 6*a* is then separated from the stack by the separating means 8 and further is transferred by the conveying means 9 to the development unit 3.

Seventh Embodiment

A photographic printing apparatus of the seventh embodiment is identical in construction of the printing and development units to that of the first embodiment. The pause transfer device 5 between the printing unit and the development unit is however modified as shown in FIGS. 22 to 26.

Figure 22:
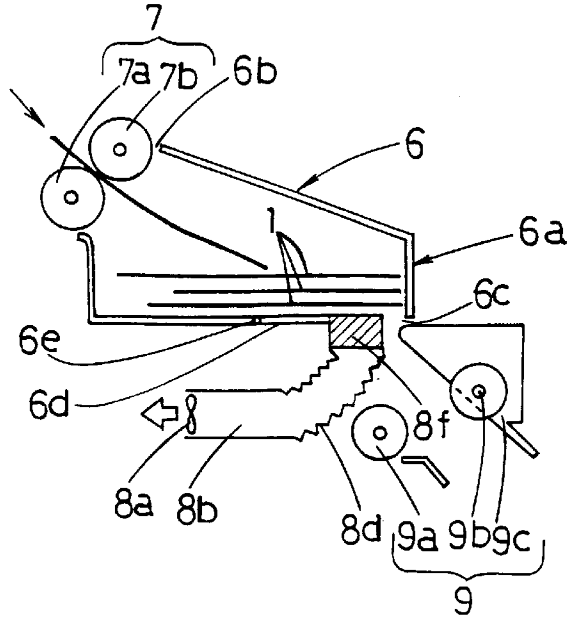
FIG. 22 is a front view of a photographic printing apparatus of a seventh embodiment of the present invention.

The modified pause transfer device 5 comprises a pausing means 6, a feeding means 7, a separating means 8, and a conveying means 9 (FIG. 22).

The pausing means 6 includes a housing 6*a* having an inlet 6*b* and an outlet 6*c* for storage of a stack of the photosensitive sheets 1. A bottom plate 6*d* is hinged at a hinge 6*e* to be downwardly inclined towards the outlet 6*c*. The feeding means 7 is disposed at the inlet 6*b* of the pausing means 6 and the outlet 6*c* is communicated with the conveying means 9. The bottom of the housing 6*a* slopes downwardly towards the far end (to the right in FIG. 22). This allows the photosensitive sheets 1 to be stacked with their leading ends uniform.

The feeding means 7 is adapted for feeding the photosensitive sheets 1 into the pausing means 6 and comprises a drive roller 7*a* and a press roller 7*b*.

Figure 23:
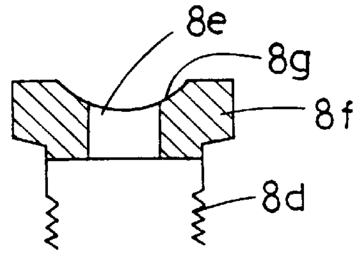
FIG. 23 is a cross sectional front view of a suction head in the seventh embodiment.
Figure 24:
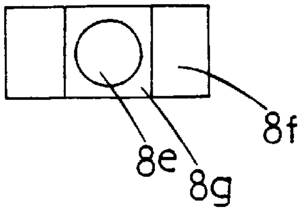
FIG. 24 is a plan view of the suction head in the seventh embodiment.

The separating means 8 is designed for separating the leading end of the lowermost photosensitive sheet 1 from the stack in the pausing means 6. The separating means 8 comprises a suction duct 8*b* provided with a suction fan 8*a*, a flexible duct 8*d* formed as a made of bellows and extending from the suction duct 8*b* to the far end of the bottom of the housing 6*a* of the pausing means 6, and a suction head 8*f* having a suction opening 8*e* therein and mounted to the open of the flexible duct 8*d*. The upper surface of the suction head 8*f* is recessed about the suction opening 8*e* constituting a separation assisting region 8*g* (FIGS. 23 and 24). The suction head 8*f* is mounted to the bottom plate 6*d* of the housing 6*a* of the pausing means 6. The bottom plate 6*d* and the suction head 8*f* are moved by a drawing means (not shown) to be pivoted to incline downwardly.

The conveying means 9 is designed for dragging out the leading end of the lowermost photosensitive sheet 1 separated by the separating means 8 from the pausing means 6 and transferring it to the development unit 3. The conveying means 9 comprises a drive roller 9*a*, a press roller 9*b*, and a transfer guide 9*c*. The transfer guide 9*c* is arranged for retracting movement in the directions denoted by the arrows by a drawing means (not shown). The transfer guide 9*c* has the press roller 9*b* mounted integrally thereto.

The operation of the pause transfer device 5 of this embodiment is as follows:

(1) The photosensitive sheets 1 from the printing unit 2 are fed by the feeding means 7 into the housing 6*a* of the pausing means 6 where they are placed one over the other for temporary storage (FIG. 22).

Figure 25:
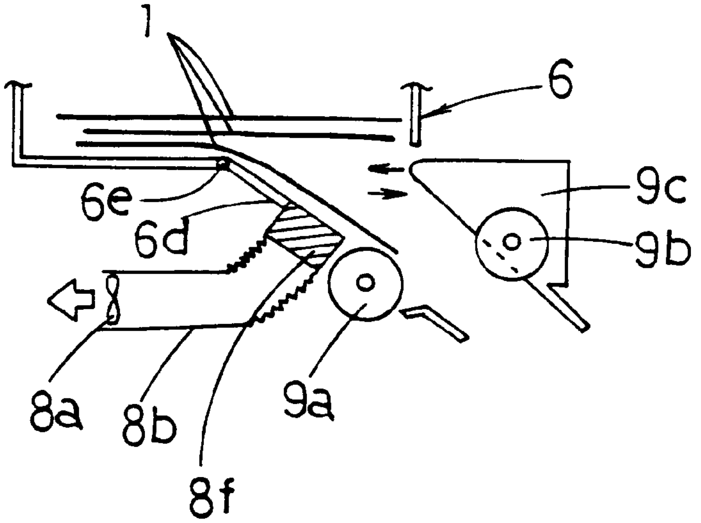
FIGS. 25 and 26 are explanatory views showing operation of the suction head in the seventh embodiment.

(2) The lowermost one of the photosensitive sheets 1 is then sucked by the suction head 8*f* (FIG. 25). Simultaneously, while the transfer guide 9*c* and the press roller 9*b* are moved backward, the suction head 8*f* is downwardly retracted to pull the leading end of the lowermost photosensitive sheet 1 along the bottom plate 6*d* of the pausing means 6 (FIG. 25). As the leading end of the lowermost photosensitive sheet 1 lowers to the separation assisting region 8*g* of the suction head 8*f*, a flow of air is introduced to between the lowermost photosensitive sheet 1 and the succeeding photosensitive sheet 1, thus separating the two sheets 1 successfully.

Figure 26:
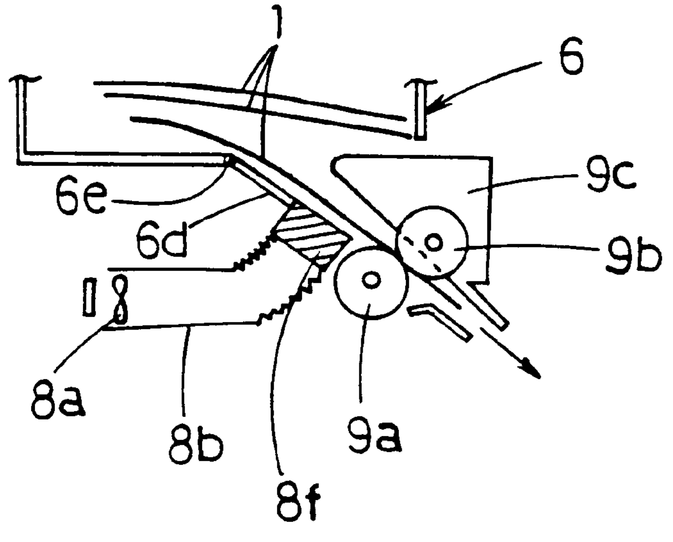

(3) The transfer guide 9c and the press roller 9b are then returned to their original positions so that the lowermost photosensitive sheet 1 is held between the press roller 9b and the drive roller 9a. As the transfer guide 9c is advanced, it comes between the lowermost photosensitive sheet 1 and the stack of the photosensitive sheets 1 (FIG. 26). Finally, the suction of the suction head 8f is canceled and the drive roller 9a with the press roller 9b is actuated to transfer the photosensitive sheet 1 to the development unit 3 (FIG. 26).

Eighth Embodiment

Figure 27:
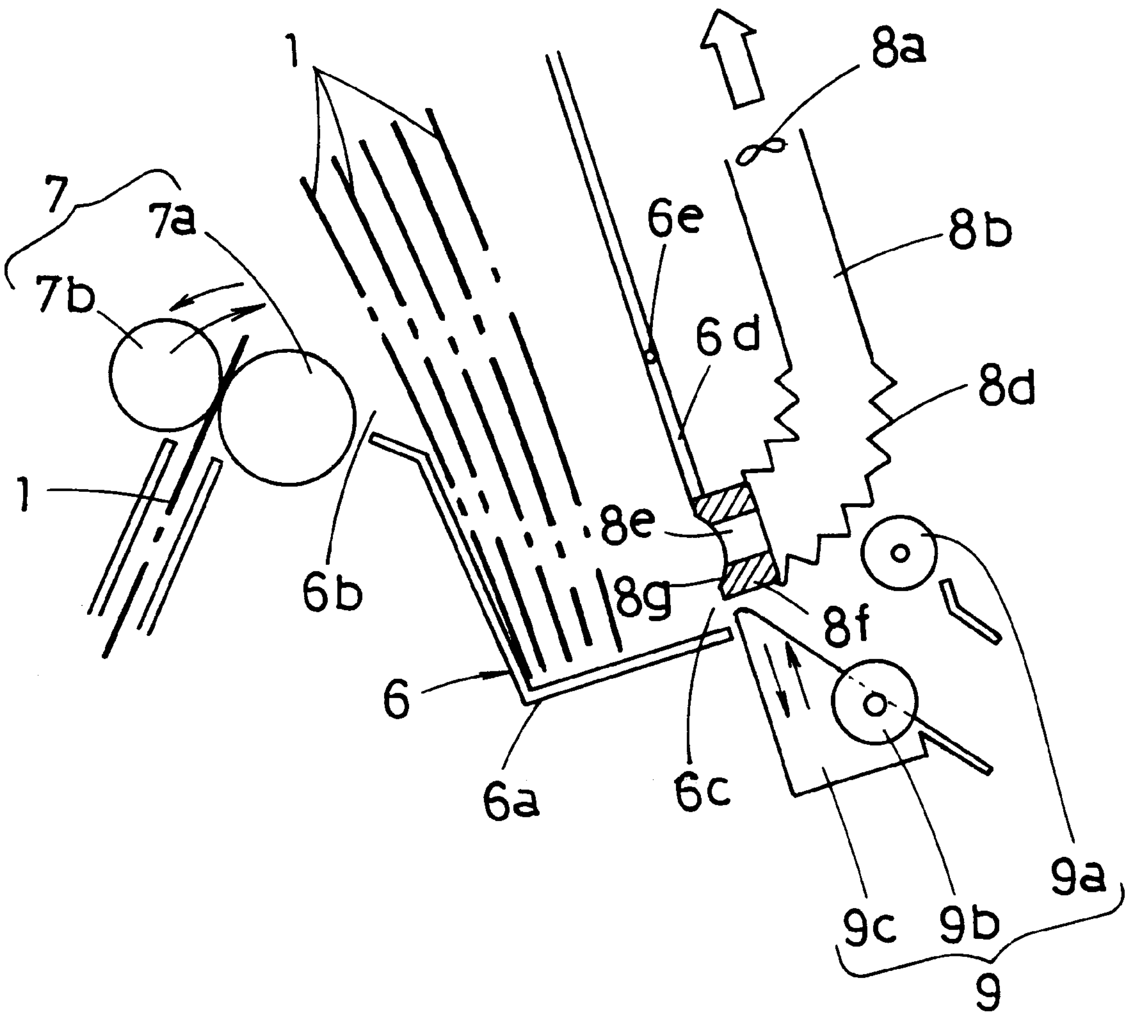
FIG. 27 is a front view of a photographic printing apparatus of an eighth embodiment of the present invention.

A photographic printing apparatus of the eighth embodiment is identical in construction of the printing and development units to that of the first embodiment. The pause transfer device 5 between the printing unit and the development unit is however modified as shown in FIG. 27.

The modified pause transfer device 5 comprises a pausing means 6, a feeding means 7, a separating means 8, and a conveying means 9. The pause transfer device 5 of this embodiment is similar to that of the sixth embodiment where the printed photosensitive sheets 1 are placed one after another from beneath for storage and delivered to the development unit 3 in a succession from above.

The pausing means 6 is adapted for accumulating the photosensitive sheets 1 in a tilted arrangement in housing 6a. The housing 6a has an inlet 6b provided at the upper end of one side thereof and an outlet 6c provided at the lower end of the opposite side thereof. Also, a lower plate 6d is provided with a hinge 6e so that it can be bent outwardly of the outlet 6c. The feeding means 7 is disposed at the inlet 6b of the housing 6a and the outlet 6c is communicated with the conveying means 9.

The separating means 8 is designed for separating the uppermost one from the stack of the photosensitive sheets 1 stored in the housing 6a of the pausing means 6. The separating means 8 comprises a suction duct 8b provided with a suction fan 8a, a flexible duct 8d formed as a bellows and extending from the suction duct 8b to a lower region of the opposite side of the housing 6a of the pausing means 6, and a suction head 8f having a suction opening 8e therein and mounted to the open end of the flexible duct 8d. The upper surface of the suction head 8f is recessed about the suction opening 8e constituting a separation assisting region 8g. The suction head 8f is mounted to the lower plate 6d of the housing 6a of the pausing means 6. The lower plate 6d and the suction head 8f are driven by a drawing means (not shown) to be turned outwardly.

The feeding means 7 and the conveying means 9 are identical in operational function to those of the sixth and seventh embodiments, respectively, and will be explained in no more detail where like components are denoted by like numerals.

In the operation of the pause transfer device 5 of the eighth embodiment, the printed photosensitive sheets 1 are accumulated in a succession in the housing 6a of the pausing means 6 as described in the sixth embodiment. The stack of the photosensitive sheets 1 are then released one after another from above by the separating means 8 and transferred by the conveying means 9 to the development unit 3.

Ninth Embodiment

A photographic printing apparatus of the ninth embodiment is identical in construction of the printing and development units to that of the first embodiment. The pause transfer device 5 between the printing unit and the development unit is however modified as shown in FIGS. 28 and 29.

Figure 28:
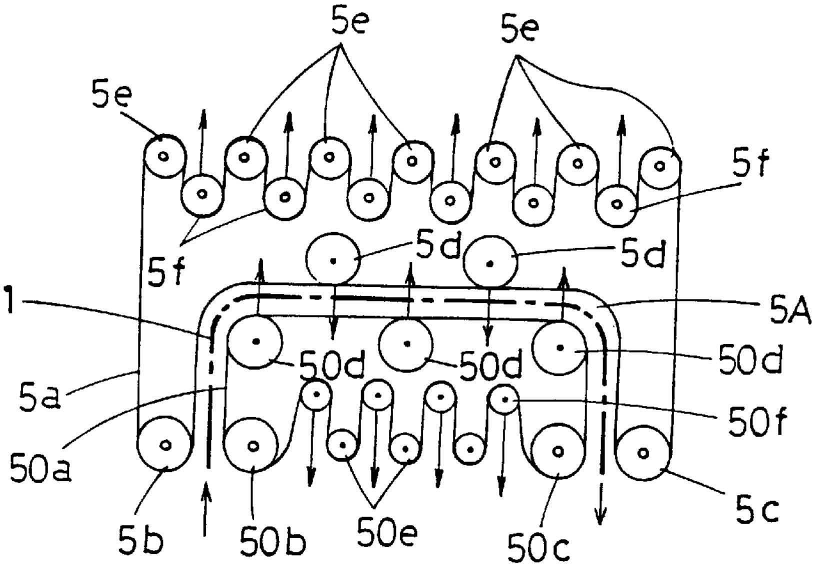
FIG. 28 is a front view of a photographic printing apparatus of a ninth embodiment of the present invention.
Figure 29:
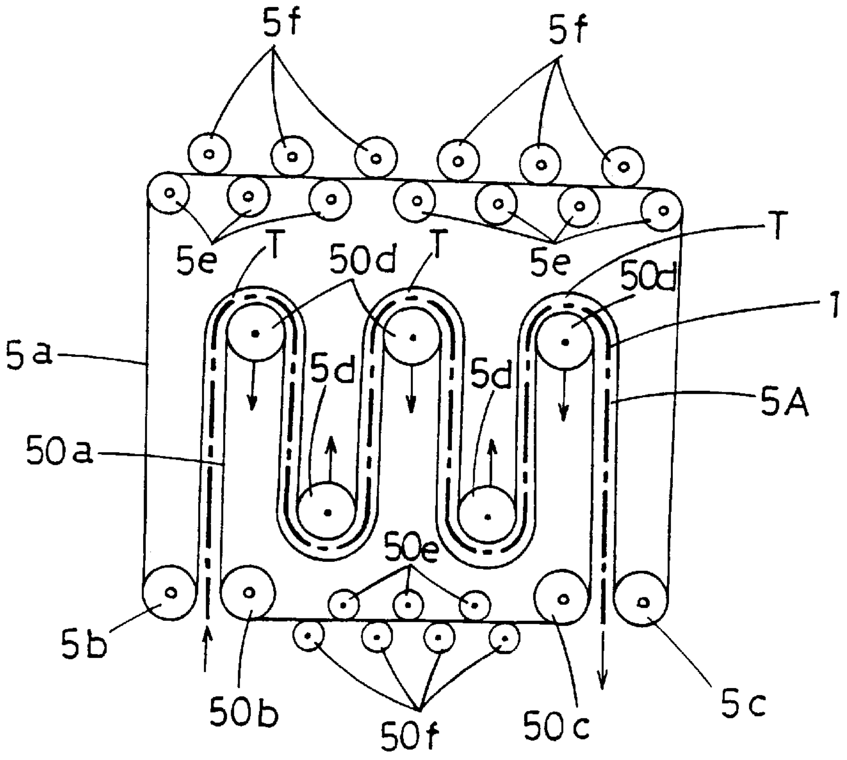
FIG. 29 is an explanatory view showing operation of a pause transfer device in the ninth embodiment.

FIG. 28 illustrates the entire arrangement of the modified pause transfer device 5, in which a transfer path 5A for holding a plurality of the photosensitive sheets 1 extends between a pair of transfer belts 5a and 50a arranged in parallel. A succession of the photosensitive sheets 1 are temporarily held along the transfer path 5A as desired.

The transfer belt 5a (an idler belt) is mounted to run along a press roller 5b disposed at the printing unit 2 side, a press roller 5c disposed at the development unit 3 side, tensioning rollers 5d between the two press rollers 5b and 5c, and a group of stationary tensioning rollers 5e and movable tensioning rollers 5f disposed outside of the transfer path 5A. Similarly, the transfer belt 50a (a driver belt) is mounted to run along a drive roller 50b disposed at the printing unit 2 side, a drive roller 50c disposed at the development unit 3 side, tensioning rollers 50d between the two drive rollers 50b and 50c, and a group of stationary tensioning rollers 50e and movable tensioning rollers 50f disposed outside of the transfer path 5A.

The tensioning rollers 5d, 50d, 5f, and 50f are arranged to be movable in the directions denoted by the arrows in FIG. 28. The tensioning rollers 5d and 50d are urged by springs in the directions of the arrows while the tensioning roller 5f and 50f are urged in the directions opposite to the arrow directions. It is assumed that when the movable rollers are at their home positions, the length of the transfer path 5A is minimum. As the tensioning rollers 5d and 50d depart from their home positions, shown in FIG. 29, the transfer path 5A is extended in length to have multiple turns T.

The rotating speeds of the drive rollers 50b and 50c at the printing unit 2 side and the development unit 3 side respectively are varied independently. The rotating operation of the drive rollers 50b and 50c and the transfer speed of the transfer belts 5a and 50a are controlled with a controller (not shown) connected to a drive circuit for the drive rollers 50b and 50c. At the time when the transfer of the printed photosensitive sheets 1 from the printing unit 2 to the development unit 3 is commenced, the length of the transfer path 5A is kept minimum for optimum transfer as shown in FIG. 28. More specifically, as the first one of the photosensitive sheets 1 is transferred to the development unit 3, its speed is identical to the processing speed in the development unit 3.

When the number of the photosensitive sheets 1 after the printing process is increased, the feeding speed determined by the drive roller 50b at the printing unit 2 side becomes greater than the transfer speed controlled by the drive roller 50c at the development unit 3 side. Accordingly, the movable tensioning rollers 5d, 50d, 5f, and 50f are moved in the directions of the arrows shown in FIG. 28. This allows the length of the transfer path 5A to increase thus holding a larger number of the photosensitive sheets 1 (FIG. 29). Then, the photosensitive sheets 1 are delivered one after another to the development unit 3 according to the speed of the developing process.

When the supply of the photosensitive sheets 1 from the printing unit 2 is exhausted, the drive roller 50b at the printing unit 2 side stops rotating while the drive roller 50C at the development unit 3 remains rotating. Accordingly, the movable tensioning rollers 5d, 50d, 5f, and 50f are returned to their home positions and the length of the transfer path 5A becomes minimum again (FIG. 28).

With a minimum length of the transfer path 5A, the drive roller 50b at the printing unit 2 side rotates at the same speed as of the drive roller 50c at the development unit 3 side to carry the photosensitive sheets 1 through the development unit 3 with no delay.

Although the tensioning rollers 5d and 50d in this embodiment are movable relatively, it is possible to allow either the rollers 5*d* or 50*d* to be moved to form turns T while the other rollers are fixed. Also, equal effects may be achieved without the stationary roller 5*e* and 50*e* and the tensioning rollers 5*f* and 50*f*.

Tenth Embodiment

A photographic printing apparatus of the tenth embodiment is identical in construction of the printing and development units to that of the first embodiment. The pause transfer device 5 between the printing unit and the development unit is however modified as shown in FIGS. 30 and 31.

Figure 30:
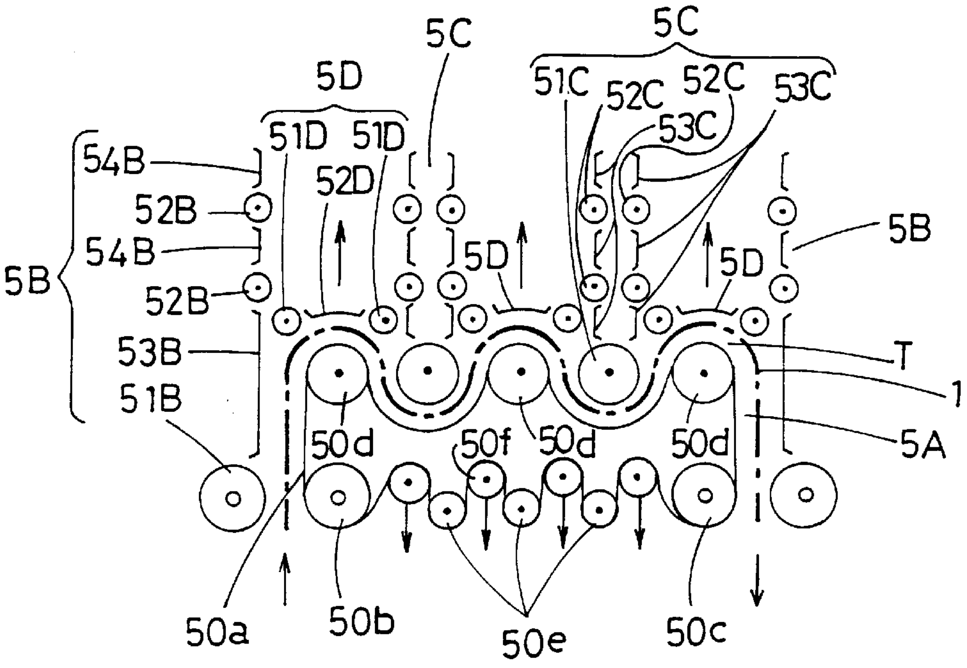
FIG. 30 is a front view of a photographic printing apparatus of a tenth embodiment of the present invention.
Figure 31:
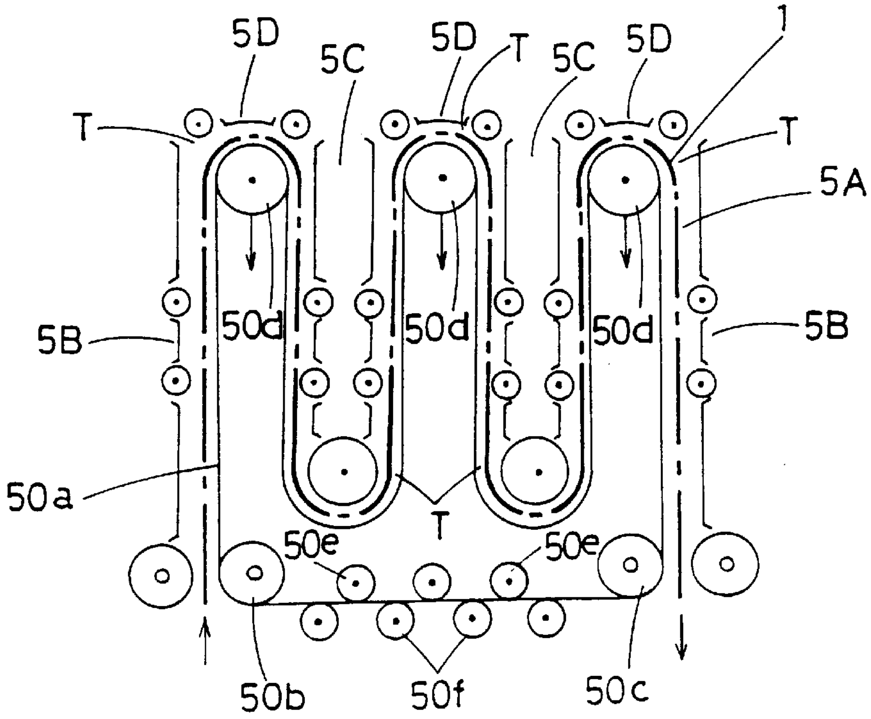
FIG. 31 is an explanatory view showing operation of a pause transfer device in the tenth embodiment.

FIG. 30 illustrates the entire arrangement of the modified pause transfer device 5. As shown, a transfer path 5A for holding a plurality of the photosensitive sheets 1 comprises a transfer belt 50*a*, transfer guide assemblies 5B and 5C disposed along the transfer belt 50*a*, and turn assemblies 5D. The transfer belt 50*a* is mounted to run along a drive roller 50*b* disposed at the printing unit 2 side, a drive roller 50*c* disposed at the development unit 3 side, tensioning rollers 50*d* between the two drive rollers 50*b* and 50*c*, and a group of stationary tensioning rollers 50*e* and movable tensioning rollers 50*f* disposed outside of the transfer path 5A.

The turn assembly 5D comprises a pair of press rollers 51D and a guide plate 52D disposed between the press rollers 51D. The guide plate 52D is formed of an arcuate shape extending along the transfer belt 50*a*. The transfer guide assembly 5B comprises a press roller 51B, guide rollers 52B, and guide plates 53B and 54B which all are aligned. Similarly, the transfer guide assembly 5C comprises a press roller 51C, guide rollers 52C, and guide plates 53C which all are aligned. The press rollers 51D, 51B, and 51C are separated from each other by a distance smaller than the transfer distance of the photosensitive sheets 1.

The tensioning rollers 50*d* and the turn assemblies 5D are movable in the directions denoted by the arrows in FIG. 30 and in opposite directions. The tensioning rollers 50*f* are also movable in the directions denoted by the arrows in FIG. 30 and in opposite directions. The tensioning rollers 50*d* and the turn assemblies 5D are urged by springs in the direction of the arrows in FIG. 30 while the tensioning rollers 50*f* remain urged in the opposite direction. Also, the length of the transfer path 5A is minimum when the movable rollers stay at their home positions.

When the tensioning rollers 50*d* and the turn assemblies 5D are moved away from their home positions, the length of the transfer path 5A becomes greater with its turns T departing from each other (FIG. 31). As the result, a larger number of the photosensitive sheets 1 will be held before being transferred one after another to the development unit 3 according to the speed of the developing process. The rotating speeds of the drive rollers 50*b* and 50C at the printing unit 2 side and the development unit 3 side respectively are varied independently. The rotation of the drive rollers 50*b* and 50*c* and the transfer speed of the transfer belt 50*a* are controlled with a controller (not shown) connected to a drive circuit for the drive rollers 50*b* and 50*c*.

At the time when the transfer of the printed photosensitive sheets 1 from the printing unit 2 to the development unit 3 is commenced, the length of the transfer path 5A is kept minimum for optimum transfer as shown in FIG. 30. More specifically, as the first one of the photosensitive sheets 1 is transferred to the development unit 3, its speed is identical to the processing speed in the development unit 3.

When the number of the photosensitive sheets 1 after the printing process is increased, the feeding speed determined by the drive roller 50*b* at the printing unit 2 side becomes greater than the transfer speed controlled by the drive roller 50*c* at the development unit 3 side. Accordingly, the movable tensioning rollers 50*d*, turn assemblies 5D, and tensioning rollers 50*f* are moved in the directions of the arrows shown in FIG. 30. This allows the length of the transfer path 5A to increase thus holding a larger number of the photosensitive sheets 1 (FIG. 31). Then, the photosensitive sheets 1 are delivered one after another to the development unit 3 according to the speed of the developing process.

When the supply of the photosensitive sheets 1 from the printing unit 2 is exhausted, the drive roller 50*b* at the printing unit 2 side stops rotating while the drive roller 50*c* at the development unit 3 remains rotating. Accordingly, the movable tensioning rollers 50*d* and 50*f* and turn assemblies 5D are returned to their home positions and the length of the transfer path 5A becomes minimum (FIG. 30).

With a minimum length of the transfer path 5A, the drive roller 50*b* at the printing unit 2 side rotates at the same speed as the drive roller 50*c* at the development unit 3 side to carry the photosensitive sheets 1 through the development unit 3 with nodelay. Also, equal effects may be achieved without the stationary rollers 50*e* and the tensioning rollers 50*f*.

Eleventh Embodiment

A photographic printing apparatus of the eleventh embodiment is identical in construction of the printing and development units to that of the first embodiment. The pause transfer device 5 between the printing unit and the development unit is however modified as shown in FIGS. 32 and 33.

The arrangement of this embodiment is identical to that of the tenth embodiment except for the turn assemblies 5D, and explanation thereof will not be repeated as like components are denoted by like numerals.

Figure 32:
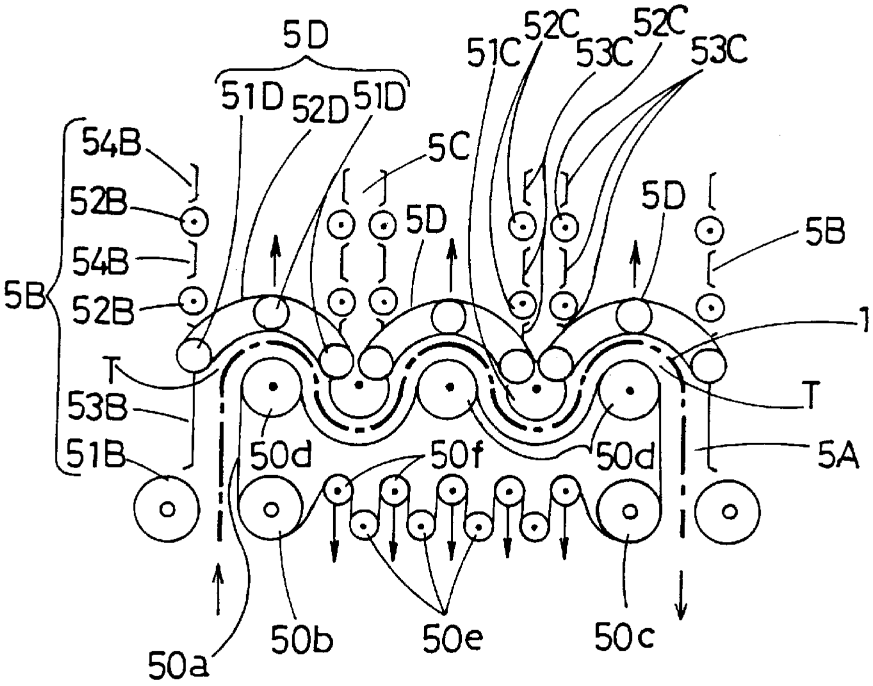
FIG. 32 is a front view of a photographic printing apparatus of an eleventh embodiment of the present invention.
Figure 33:
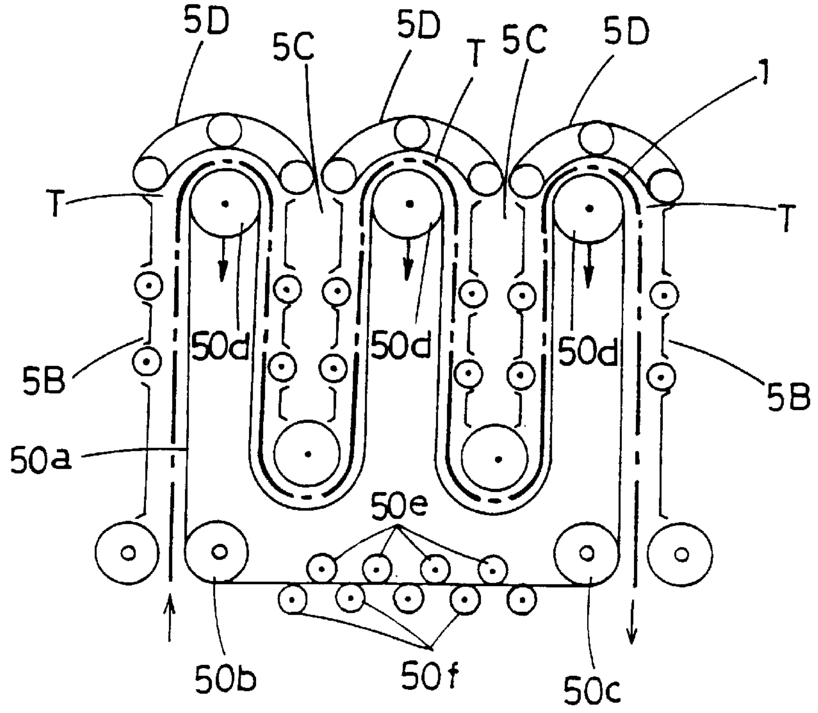
FIG. 33 is an explanatory view showing operation of a pause transfer device in the eleventh embodiment.

The turn assembly 5D of the eleventh embodiment comprises rollers 51D and a turn belt 52D mounted to run along the rollers 51D in a curved loop, as shown in FIG. 32. The tensioning rollers 50*d* and the turn assemblies 5D are movable in the directions denoted by the arrows in FIG. 32 and in opposite directions. Also, the tensioning rollers 50*d* and the turn assemblies 5D remain urged by springs in the direction of the arrow. When the tensioning rollers 50*d* and the turn assemblies 5D are moved away from the minimum of the transfer path 5A, the length of the transfer path 5A becomes greater with its turns T departing from each other (FIG. 33).

At the time when the transfer of the printed photosensitive sheets 1 from the printing unit 2 to the development unit 3 is commenced, the length of the transfer path 5A is kept minimum for optimum transfer as shown in FIG. 32. More specifically, as the first one of the photosensitive sheets 1 is transferred to the development unit 3, its speed is identical to the processing speed in the development unit 3.

When the number of the photosensitive sheets 1 after the printing process is increased, the feeding speed determined by the drive roller 50*b* at the printing unit 2 side becomes greater than the transfer speed controlled by the drive roller 50*c* at the development unit 3 side. Accordingly, the movable tensioning rollers 50*d*, turn assemblies 5D, and tensioning rollers 50*f* are moved in the directions of the arrows shown in FIG. 32. This allows the length of the transfer path 5A to increase thus holding a larger number of the photosensitive sheets 1 (FIG. 33). Then, the photosensitive sheets 1 are delivered one after another to the development unit 3 according to the speed of the developing process.

When the supply of the photosensitive sheets 1 from the printing unit 2 is exhausted, the drive roller 50*b* at the printing unit 2 side stops rotating while the drive roller 50*c* at the development unit 3 remains rotating. Accordingly, the movable tensioning rollers 50*d* and 50*f* and turn assemblies 5D are returned to their home positions and the length of the transfer path 5A becomes minimum again (FIG. 32).

With a minimum length of the transfer path 5A, the drive roller 50*b* at the printing unit 2 side rotates at the same speed as of the drive roller 50*c* at the development unit 3 side to carry the photosensitive sheets 1 through the development unit 3 with no delay. Also, equal effects may be achieved without the stationary rollers 50*e* and the tensioning rollers 50*f*.

It will be understood that the number of the photosensitive sheets to be held in the pause transfer device 5 of any of the first to eleventh embodiments is at least four or more. Also, the number of the photosensitive sheets 1 may be varied depending on the speed of the developing process.

We claim:

1. A photographic printing apparatus comprising:

a printing station for printing on photographic paper images of a negative film;

a development station for developing printed sheets of the photographic paper;

a transfer passage extending between said printing station and said development station and along which the printed sheets are supplied; and a pause transfer device disposed at said transfer passage for temporarily stockpiling an excess of the printed sheets above a number thereof that can be accommodated by developing conducted at said development station and for transferring printed sheets one after another to said development station depending on conditions of said developing thereat, said pause transfer device comprising means for continuously holding the excess of printed sheets prior to said transferring thereof to said development station.

2. An apparatus as claimed in claim 1, wherein a number of the printed sheets that can be stockpiled by said pause transfer device is determined based on a relationship between a time interval required for replacement of the negative film at said printing station and the efficiency of said developing at said development station.

3. An apparatus as claimed in claim 2, wherein said pause transfer device is capable of stockpiling at least four printed sheets.

4. An apparatus as claimed in claim 2, wherein said pause transfer device is capable of adjustment to vary the number of printed sheets that can be stockpiled thereby.

5. An apparatus as claimed in claim 1, wherein said pause transfer device is capable of adjustment to vary the number of printed sheets that can be stockpiled thereby.

6. An apparatus as claimed in claim 1, wherein said means for continuously holding comprises a carrier member mounted for movement in a closed path, and a plurality of gripper members mounted on said carrier member at equal spaced intervals for movement therewith.

7. An apparatus as claimed in claim 6, wherein said pause transfer device further comprises a feeder for guiding printed sheets from said printing station one at a time to a feeding location whereat leading ends of the thus guided printed sheets are gripped by respective said gripper members and continuously held thereby while said carrier member moves in said closed path from said feeding location to a transfer location, and a conveying device at said transfer location for releasing the leading ends of the printed sheets from said respective gripper members and for delivering the thus released printed sheets toward said development station.

8. An apparatus as claimed in claim 1, wherein said means for continuously holding comprises members defining said transfer passage, and said pause transfer device further comprises means for moving said members and thereby adjusting the length of said transfer passage.

9. An apparatus as claimed in claim 8, wherein said members defining said transfer passage comprise a pair of belts, and said means for moving comprises plural adjustment members movable in synchronization to cause said belts to move along a more or less serpentine path.

10. An apparatus as claimed in claim 9, wherein said adjustment members comprise rollers.

11. An apparatus as claimed in claim 8, wherein said members defining said transfer passage comprise a belt and at least one of an oppositely positioned pressing belt, guide and press roller, and said means for moving comprises means for moving said at least one of said oppositely positioned pressing belt, guide and press roller relative to said belt.

12. An apparatus as claimed in claim 1, wherein said means for continuously holding comprises a pair of parallel transfer belts, and said pause transfer device further comprises a feeder for feeding printed sheets from said printing station between said pair of transfer belts so that the thus fed printed sheets are held thereby in overlapped alignment, and conveying means for separating one after another leading ends of the thus held printed sheets from one said transfer belt and for conveying the thus separated printed sheets toward said development station.

13. An apparatus as claimed in claim 1, wherein said means for continuously holding comprises an endless belt formed of a plurality of holding plates that are hinged together end to end with adjacent said holding plates being folded, and said pause transfer device further comprises a storage device for temporarily storing a part of said endless belt in folded form, a belt loader for loading said endless belt into said storage device, a belt unloader for unloading said endless belt from said storage device, a feeder for feeding and sandwiching printed sheets one by one between respective pairs of adjacent said holding plates in synchronization with operation of said belt loader, and conveying means for withdrawing the printed sheets one by one from said respective pairs of holding plates in synchronization with operation of said belt unloader and for transferring the thus withdrawn printed sheets toward said development station.

14. An apparatus as claimed in claim 1, wherein said means for continuously holding comprises a stacking arrangement for holding a plurality of the printed sheets in a stack, and said pause transfer device further comprises a feeder for feeding the printed sheets into said stacking arrangement, a separating device for sequentially separating one of a lowermost and an uppermost printed sheet of the stack of printed sheets from the stack, and conveying means for gripping a leading end of the thus separated printed sheet and for transferring the thus gripped printed sheet toward said development station.

15. An apparatus as claimed in claim 14, wherein said separating device comprises a suction head for grasping a leading end of the lowermost or uppermost printed sheet, and means for moving said suction head and the thus grasped leading end in a direction away from the stack.

16. An apparatus as claimed in claim 15, wherein said separating device further comprises an additional suction head for grasping a trailing end of the lowermost or uppermost printed sheet.

17. An apparatus as claimed in claim 15, wherein said suction head has therein suction openings.

18. An apparatus as claimed in claim 15, wherein said suction head has therein a suction opening and a recess formed around said suction opening to form a separation assisting region.

19. An apparatus as claimed in claim 14, wherein said conveying means includes a pair of rollers operable to nip therebetween the separated printed sheet.

* * * * *